United States Patent
Steele, Jr. et al.

(10) Patent No.: US 6,791,939 B1
(45) Date of Patent: Sep. 14, 2004

(54) DYNAMIC GENERATION OF DEADLOCK-FREE ROUTINGS

(75) Inventors: Guy L. Steele, Jr., Lexington, MA (US); Steven K. Heller, Chelmsford, MA (US); Daniel Cassiday, Topsfield, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/323,964

(22) Filed: Jun. 2, 1999

(51) Int. Cl.[7] .................. G01R 31/08; G06F 15/173
(52) U.S. Cl. .................. 370/217; 370/219; 370/238; 370/400; 709/238; 709/239
(58) Field of Search ................ 370/238, 400, 370/216–228, 238.1, 237, 242, 244, 245; 714/4, 712; 709/242, 220, 221, 222, 235, 238, 239, 241

(56) References Cited

U.S. PATENT DOCUMENTS

| | | | |
|---|---|---|---|
| 4,742,511 A | * | 5/1988 | Johnson ..................... 370/406 |
| 5,128,932 A | | 7/1992 | Li |
| 5,453,978 A | | 9/1995 | Sethu et al. |
| 5,592,610 A | * | 1/1997 | Chittor ......................... 714/4 |
| 5,602,839 A | | 2/1997 | Annapareddy et al. |
| 5,680,116 A | | 10/1997 | Hashimoto et al. |
| 5,721,819 A | | 2/1998 | Galles et al. |
| 5,740,346 A | | 4/1998 | Wicki et al. |
| 5,751,710 A | | 5/1998 | Crowther et al. |
| 5,751,967 A | | 5/1998 | Raab et al. |
| 5,768,501 A | | 6/1998 | Lewis |
| 5,781,546 A | | 7/1998 | Sethu |
| 5,812,549 A | | 9/1998 | Sethu ......................... 370/389 |
| 5,856,981 A | * | 1/1999 | Voelker ....................... 714/712 |
| 5,859,981 A | | 1/1999 | Levin et al. |
| 5,874,964 A | | 2/1999 | Gille |
| 5,884,047 A | | 3/1999 | Aikawa et al. |
| 5,898,826 A | * | 4/1999 | Pierce et al. ........... 395/182.02 |
| 5,914,953 A | | 6/1999 | Krause et al. |
| 5,970,232 A | | 10/1999 | Passint et al. |
| 6,005,860 A | | 12/1999 | Anderson et al. |

(List continued on next page.)

FOREIGN PATENT DOCUMENTS

| | | |
|---|---|---|
| EP | 0817097 A2 | 1/1998 |

OTHER PUBLICATIONS

Peercy, M. et al., "Distributed Algorithms for Shortest-Path, Deadlock-Free Routing and Broadcasting in Arbitrarily Faulty Hypercubes," International Symposium on Fault Tolerant Computing Systems (FTCS), US, Los Alamitos, IEEE Comp. Soc. Press, vol. Symp. 20, Jun. 26, 1990, pp. 218–225.

(List continued on next page.)

*Primary Examiner*—Hanh Nguyen
(74) *Attorney, Agent, or Firm*—Finnegan, Henderson, Farabow, Garrett & Dunner, L.L.P.

(57) ABSTRACT

In accordance with methods and systems consistent with the present invention, an improved failure recovery system is provided that, upon detecting a failure, generates new routings for the network which (1) avoid the failure and (2) avoid deadlock. In this manner, after a failure is detected, the network remains as operational as possible while still avoiding deadlock. Thus, by using the improved failure recovery system, a network failure has a much less severe impact on the network than in conventional systems.

26 Claims, 13 Drawing Sheets

U.S. PATENT DOCUMENTS

| | | | |
|---|---|---|---|
| 6,031,835 A | | 2/2000 | Abali et al. |
| 6,055,618 A | | 4/2000 | Thorson |
| 6,064,671 A | | 5/2000 | Killian |
| 6,065,063 A | * | 5/2000 | Abali .................. 709/242 |
| 6,097,718 A | | 8/2000 | Bion |
| 6,137,781 A | | 10/2000 | Goto et al. |
| 6,230,252 B1 | | 5/2001 | Passint et al. |
| 6,243,760 B1 | | 6/2001 | Armbruster et al. |
| 6,256,295 B1 | | 7/2001 | Callon |
| 6,282,170 B1 | * | 8/2001 | Bentall et al. ............. 370/225 |
| 6,295,573 B1 | | 9/2001 | Bailey et al. |
| 6,324,162 B1 | * | 11/2001 | Chaudhuri ............. 370/225 |
| 6,437,804 B1 | | 8/2002 | Ibe et al. |
| 6,567,382 B1 | * | 5/2003 | Cox .................... 370/255 |

OTHER PUBLICATIONS

Fleury, E. et al., "A General Theory for Deadlock Avoidance in Wormhole–Routed Networks," IEEE Trans. on Parallel and Distributed Systems, IEEE Inc., NY, vol. 9, No. 7, Jul. 1, 1998, pp. 626–638.

Pifarre G. D. et al., "Adaptive Deadlock–and Livelock–Free Routing in the Hypercube Network," IEEE Trans. on Parallel and Distributed Systems, IEEE Inc., NY, vol. 5, No. 11, Nov. 1, 1994, pp. 1121–1138.

Whay C. Lee, "Topology Aggregation for Hierarchical Routing in ATM Networks." Apr. 1, 1995, pp. 82–92, Computer–Communication Review.

IBM, "Clustering Algorithm for Computer Network Management Graphics," Jun. 1988, pp. 71–79, IBM Technical Disclosure Bulletin, vol. 31, No. 1.

* cited by examiner

US 6,791,939 B1

DYNAMIC GENERATION OF DEADLOCK-FREE ROUTINGS

RELATED APPLICATIONS

The following identified U.S. patent applications are relied upon and are incorporated by reference in this application.

U.S. patent application Ser. No. 09/323,963, entitled "Improved Network Topologies," filed on even date herewith, assigned to a common assignee.

U.S. patent application Ser. No. 09/323,696, entitled "Deadlock-Free Routing," filed on even date herewith, assigned to a common assignee.

U.S. patent application Ser. No. 09/323,965, entitled "Recursive Partitioning of Networks," filed on even date herewith, assigned to a common assignee.

U.S. patent application Ser. No. 09/323,962, entitled "Improved Network Reconfiguration," filed on even date herewith, assigned to a common assignee.

FIELD OF THE INVENTION

The present invention relates generally to data processing systems and, more particularly, to dynamic generation of deadlock-free routings.

BACKGROUND OF THE INVENTION

Networks comprise a number of nodes that are interconnected via links. As used herein, the term "node" refers to any device capable of communicating, such as a computer, router, switch, network processor, or symmetric multiprocessor. The specific configuration of nodes and links in a network is referred to as the "network topology."

Each node routes network traffic by interacting with internal buffers that store packets. Specifically, each of a node's links typically has an associated buffer ("receive buffer") that temporarily stores packets received via the link, and each of a node's links typically has an associated buffer ("send buffer") that temporarily stores packets before they are sent across the link. When a packet is received by a node that is not its destination, the packet arrives in one of the node's receive buffers. The node then determines which link to send the packet over using a routing algorithm. After the appropriate link is selected, the packet is stored in that link's send buffer for transmission. However, sometimes the node at the other end of the selected link is busy; in which case, the receive buffer for the link may be full. Thus, the packet cannot be sent and remains in the send buffer until the other node's receive buffer empties. As a result, network traffic can form congestion which may lead to deadlock.

Deadlock occurs when a cycle of multi-hop packets are each waiting on a busy node on the next hop. A "multi-hop" packet refers to a packet that is routed through at least one node before reaching its destination. A deadlock may occur, for example, in a network of three nodes (node 1, node 2, and node 3), where node 1 is waiting to send a multi-hop packet to node 2 (which is not the packet's destination), where node 2 is waiting to send a multi-hop packet to node 3 (which is not the packet's destination), and where node 3 is waiting to send a multi-hop packet to node 1 (which is not the packet's destination). Since each node is waiting on the other, a stalement or deadlock occurs, and these nodes are rendered nonoperational.

To prevent deadlock from occurring, some networks have been developed that route traffic using predefined calculations. One family of networks that routes traffic in this way includes the hypercube family of networks depicted in FIG. 1A. The hypercube networks are configured according to a predefined pattern. The hypercube networks accommodate only networks with a number of nodes that can be expressed as a power of 2. Accordingly, FIG. 1A depicts the hypercube networks having 2, 4, 8, and 16 nodes. The pattern that the hypercube networks follow is apparent from an examination of the different topologies.

To prevent deadlock in the hybercube networks, routing is performed using predefined calculations. For example, FIG. 1B depicts an example of a hypercube network of 8 nodes that performs this type of routing. Each node of the network is associated with a binary number (e.g., 010). When routing a packet through the network, each node performs a calculation to determine to which node to send the packet. According to this calculation, the number of the current node is compared to the number of the destination node of the packet to find the most significant bit that differs. The packet is then forwarded to a node whose number differs from the number of the current node in exactly that bit position. For example, node 000 will send a packet destined for node 111 to node 100 instead of 010 or 001, because the third bit position (from the right) is the most significant. This calculation is performed at each node until the destination node is reached. Use of this calculation on each node prevents deadlock by preventing a cycle from occurring in the network. That is, there are no possible sequences of multi-hop packets that can form a loop.

Although it prevents deadlock, this routing method cannot be changed at runtime. Therefore, if a failure occurs, network traffic cannot be rerouted to avoid the failure, thus significantly impacting the performance of the network. For example, if the failure were a node failure, all paths through this node are rendered nonoperational until the node is repaired, which renders the entire network virtually nonoperational. It is thus desirable to improve network operation when a failure is encountered.

SUMMARY OF THE INVENTION

In accordance with methods and systems consistent with the present invention, an improved failure recovery system is provided that, upon detecting a failure, generates new routings for the network which (1) avoid the failure and (2) avoid deadlock. In this manner, after a failure is detected, the network remains as operational as possible while still avoiding deadlock. Thus, by using the improved failure recovery system, a network failure has a much less severe impact on the network than in conventional systems.

In accordance with methods consistent with the present invention, a method is provided in a distributed system containing nodes interconnected via links. Each node contains a routing table with routings for routing traffic. The method initiates operation of the distributed system such that the traffic is routed through the nodes using the routings contained in the routing tables. Furthermore, while the distributed system remains operational, the method generates new routings for the routing tables that avoid deadlock and updates the routing tables to utilize the new routings.

In accordance with methods consistent with the present invention, a method is provided in a data processing system having a network with nodes and links interconnecting the nodes. This method assigns numerical values to each of the links and identifies, for each pair of the nodes, a path through the network that traverses at least one of the links. Furthermore, the method determines whether the numerical values for each link of each path that traverses more than one link follows a predefined sequence and determines that routing traffic through the network using the paths avoids deadlock when it is determined that the numerical values for each link of each path that traverses more than one link follows the predefined sequence.

In accordance with methods consistent with the present invention, a method is provided in a data processing system with a network having nodes and routings for routing traffic between a plurality of the nodes. The routings lack a routing for routing traffic between a first of the nodes and a second of the nodes. The method identifies a proposed route for routing traffic between the first node and the second node, determines whether adding the proposed route to the routings subjects the network to deadlock, and adds the proposed route to the routings when it is determined that the addition of the proposed route to the routings does not subject the network to deadlock.

In accordance with methods consistent with the present invention, a method is provided in a data processing system having a network with nodes and links interconnecting the nodes. The data processing system has routings for routing traffic between a plurality of the nodes. The routings lack a routing for routing traffic between a first of the nodes and a second of the nodes. This method adds a new routing to the routings for transferring traffic between the first node and the second node, determines that the routings subject the network to deadlock, and replaces a routing other than the new routing to render the network deadlock free.

In accordance with systems consistent with the present invention, a distributed system is provided with a plurality of nodes that route traffic using routings in routing tables. The distributed system contains a failure recovery one of the plurality of nodes including a memory and a processor. The memory contains a failure recovery program having code that detects when a network failure occurs, having code that generates new routings for the routing tables that avoid the network failure and that avoid deadlock when the network failure occurs, and having code that updates the routings in the routing tables with the new routings so that the network failure is avoided and deadlock is avoided. The processor runs the failure recovery program.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1A:
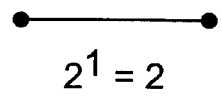
FIG. 1A depicts the hypercube family of networks.
Figure 1A:
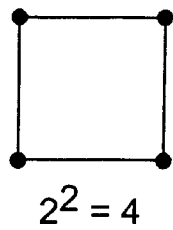
Figure 1A:
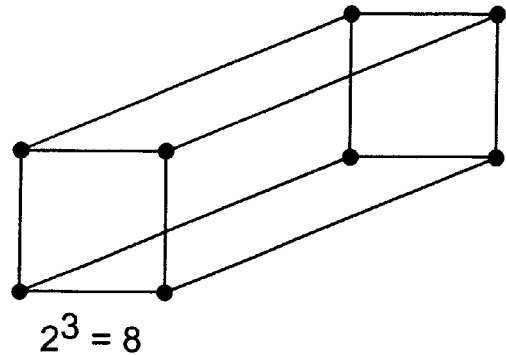
Figure 1A:
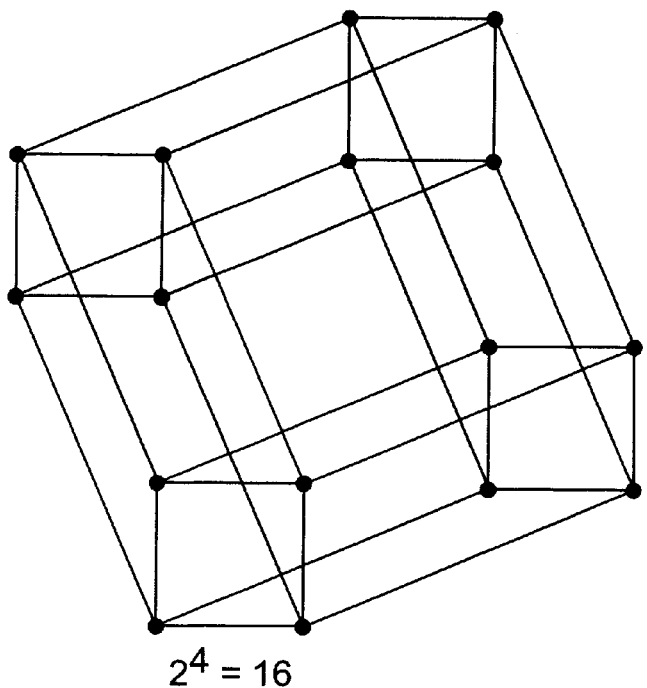
Figure 1B:
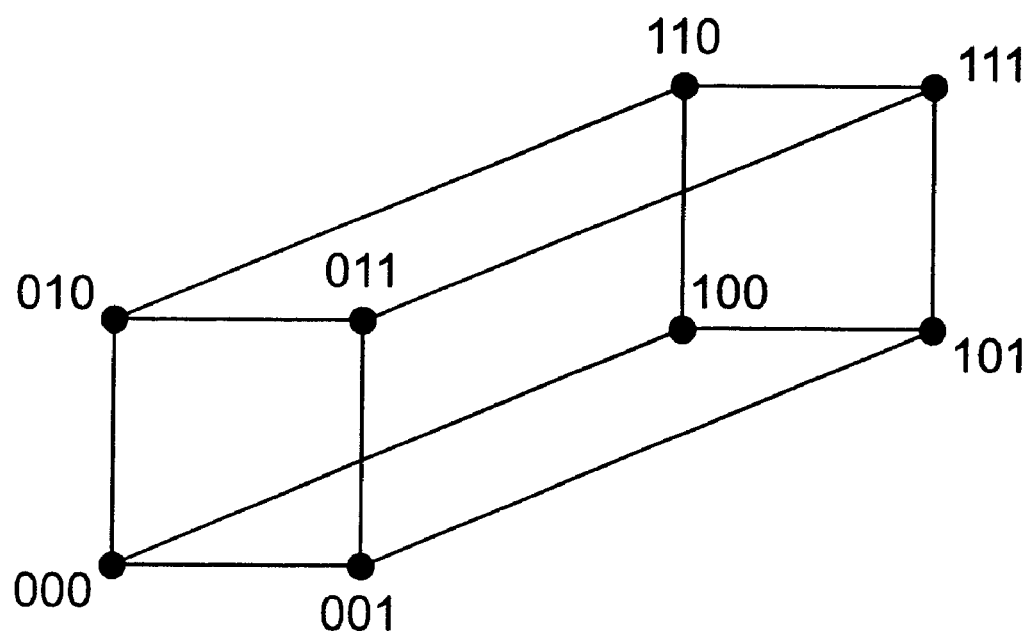
FIG. 1B depicts the hypercube network with eight nodes from FIG. 1A where its nodes are numbered as part of its routing algorithm.

In accordance with methods and systems consistent with the present invention, an improved failure recovery system is provided. Using this system, when a failure is encountered, the system automatically generates new routings for the network that both avoid the failure and avoid deadlock. This routing generation occurs while the components of the network, except for the one experiencing the failure, remain operational. As a result, the impact of a network failure is greatly reduced over conventional systems.

In accordance with methods and systems consistent with the present invention, the failure recovery system operates in a network that utilizes static routing tables to perform routing. The failure recovery system detects when a failure occurs, determines the topology of the operational parts of the network, and then generates new routing tables for the network. These routing tables contain routings that both avoid the network failure and avoid deadlock. During the time between failure detection and new routing table generation, the network remains operational in that programs on the nodes continue to send and receive packets, but the nodes buffer these packets until the new routing tables are generated. Once generated, the nodes resume routing the packets using the newly generated routing tables. The time during which the packets are buffered is very small, on the order of a few seconds, and thus no data loss is incurred. By using this system, the network remains operational, experiencing little disruption beyond that of the failure, and new deadlock-free routings are generated, so that the network can continue to operate as much as possible until the failure is repaired.

OVERVIEW

When a failure occurs, the improved failure recovery system first determines the topology of the network components that remain operational. After making this determination, the failure recovery system labels each link with a number according to a predefined algorithm that is designed to maximize throughput of the routings that the failure recovery system will generate. After numbering the links, the failure recovery system then generates an initial set of routings for the network by identifying the best path between every pair of nodes such that the label number of the links traversed occurs in an ascending order. That is, the sequence of links between the source node and the destination node in a path will be in a strictly ascending order. By ensuring that no paths between two nodes violates this ascending order, the failure recovery system ensures that the routings are deadlock free because cycles are avoided. When determining the best path between two nodes, the failure recovery system considers such factors as path length and throughput. After creating the initial routings, there may be some pairs of nodes that are not connected.

Once the initial routings have been constructed, the failure recovery system then attempts to add a routing between nodes where none exists and attempts to improve existing routings by reducing the path length. When attempting to add a routing between two nodes for which none exists, the failure recovery system identifies all possible routes between the two nodes, even though the sequence of link labels may not increase. In the situation where the failure recovery system attempts to improve a path, only those paths of a shorter length are generated. Then, the failure recovery system examines each generated route to determine the shortest of the routes, and of these, the failure recovery system determines if any would not subject the network to deadlock. If such a route is found between two nodes, it is retained as the path between those nodes.

If, however, no such paths are identified, the failure recovery system then performs additional processing in a further attempt to create or improve a path. It does so by identifying all possible paths again. Then, the failure recovery system selects a path and determines if use of the selected path subjects the network to deadlock. If the selected path subjects the network to deadlock, the failure recovery system identifies the cycle created by the selected path and then attempts to destroy the cycle by replacing one of the paths in the cycle other than the selected path. To do so, the failure recovery system identifies the paths that comprise the cycle, and for each of these paths, the failure recovery system attempts to remove the path and replace it with another path that breaks the cycle. If such a replacement is found, the selected path can remain while deadlock can be avoided because the replacement path breaks the cycle.

In accordance with methods and systems consistent with the present invention, the failure recovery system operates in a family of network topologies which have been selected to facilitate network performance. These network topologies are discussed in further detail in copending U.S. patent application Ser. No. 09/323,963, entitled "Improved Network Topologies," which has been previously incorporated by reference. These network topologies use deadlock-free routings as described in copending U.S. patent application Ser. No. 09/323,696, entitled "Deadlock-Free Routing," which has previously been incorporated by reference. In addition to being selected for network performance characteristics, these network topologies have also been selected to facilitate reconfiguration as is further described in copending U.S. patent application Ser. No. 09/323,962, entitled "Improved Network Reconfiguration," which has previously been incorporated by reference.

IMPLEMENTATION DETAILS

Figure 2:
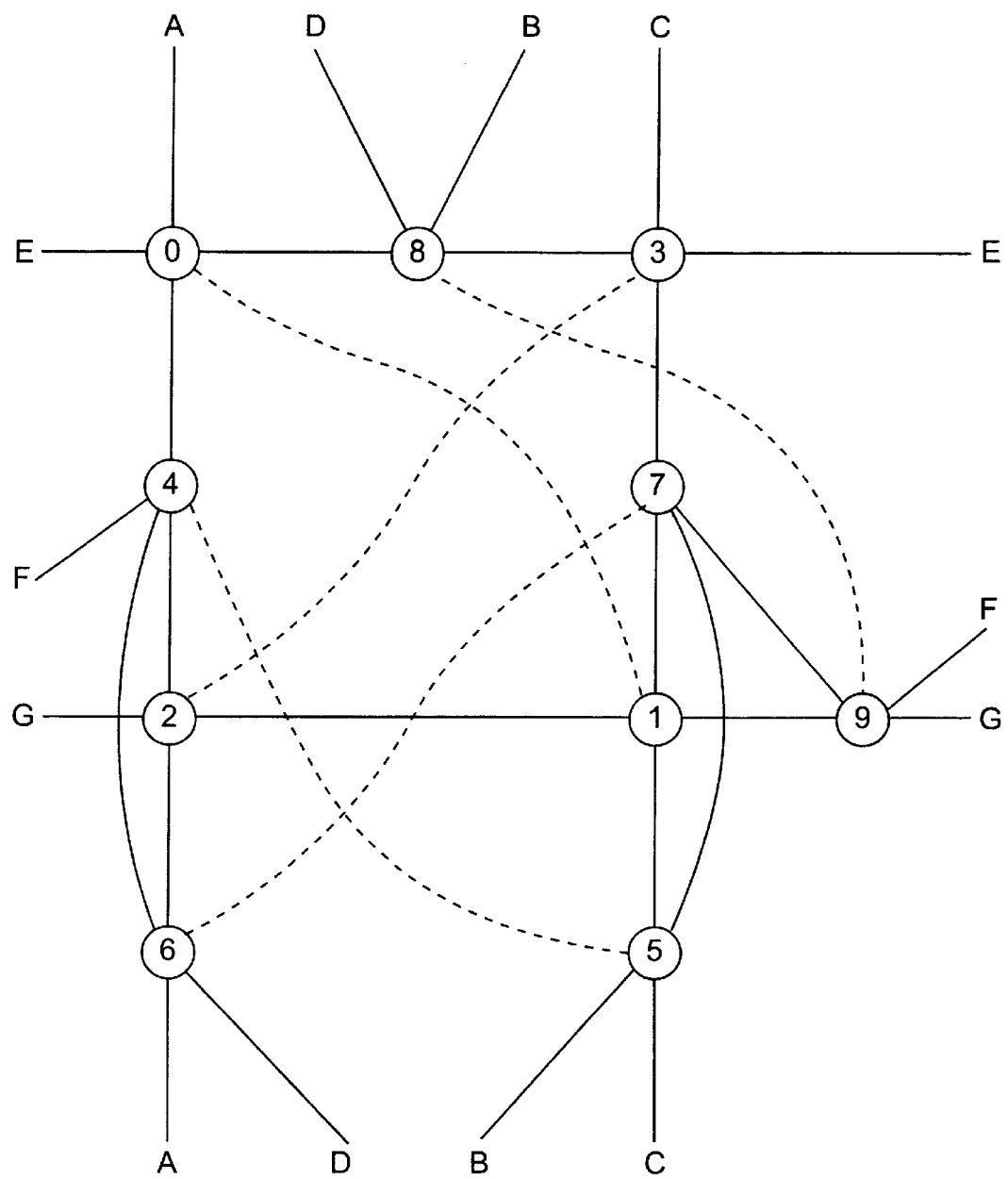
FIG. 2 depicts a network suitable for use with methods and systems consistent with the present invention.

FIG. 2 depicts an exemplary network having ten nodes in accordance with methods and systems consistent with the present invention. Each node, node 0 through node 9, has up to five links to other nodes. Each link is depicted as either a solid line or a dashed line. A solid line indicates that the link is a nonpartner link; a dashed line indicates that the link is a partner link between partner nodes. A "partner link" refers to a link between two nodes ("partner nodes") that are contained in the same device. A partner link and partner nodes are further described below. In FIG. 2, the letters (e.g., "A") indicate a continuing connection to another like-lettered node. For example, node 0 is connected to node 6.

As shown in FIG. 2, node 0 has a partner link with node 1 and directly connects to nodes 3, 4, 6, and 8. Node 1 has a partner link with node 0 and directly connects to nodes 2, 5, 7, and 9. Node 2 has a partner link with node 3 and directly connects to nodes 1, 4, 6, and 9. Node 3 has a partner link with node 2 and directly connects to nodes 0, 5, 7, and 8. Node 4 has a partner link with node 5 and directly connects to nodes 0, 2, 6, and 9. Node 5 has a partner link with node 4 and directly connects to nodes 1, 3, 7, and 8. Node 6 has a partner link with node 7 and directly connects to nodes 0, 2, 4, and 8. Node 7 has a partner link with node 6 and directly connects to nodes 1, 3, 5, and 9. Node 8 has a partner link with node 9 and directly connects to nodes 0, 3, 5, and 6, and node 9 has a partner link with node 8 and directly connects to nodes 1, 2, 4, and 7. Below is a deadlock-free routing table for this network.

| FROM \ TO | 0 | 1 | 2 | 3 | 4 | 5 | 6 | 7 | 8 | 9 |
|---|---|---|---|---|---|---|---|---|---|---|
| 0 |   | — | 3 | — | — | 4 | — | 6 | — | 8 |
| 1 | — |   | — | 2 | 5 | — | 7 | — | 9 | — |
| 2 | 1 | — |   | — | — | 4 | — | 6 | 9 | — |
| 3 | — | 0 | — |   | 5 | — | 7 | — | — | 8 |
| 4 | — | 0 | — | 2 |   | — | — | 6 | 9 | — |
| 5 | 1 | — | 3 | — | — |   | 7 | — | — | 8 |
| 6 | — | 0 | — | 2 | — | 4 |   | — | — | 8 |
| 7 | 1 | — | 3 | — | 5 | — | — |   | 9 | — |
| 8 | — | 0 | 3 | — | 5 | — | — | 6 |   | — |
| 9 | 1 | — | — | 2 | — | 4 | 7 | — | — |   |

Figure 3:
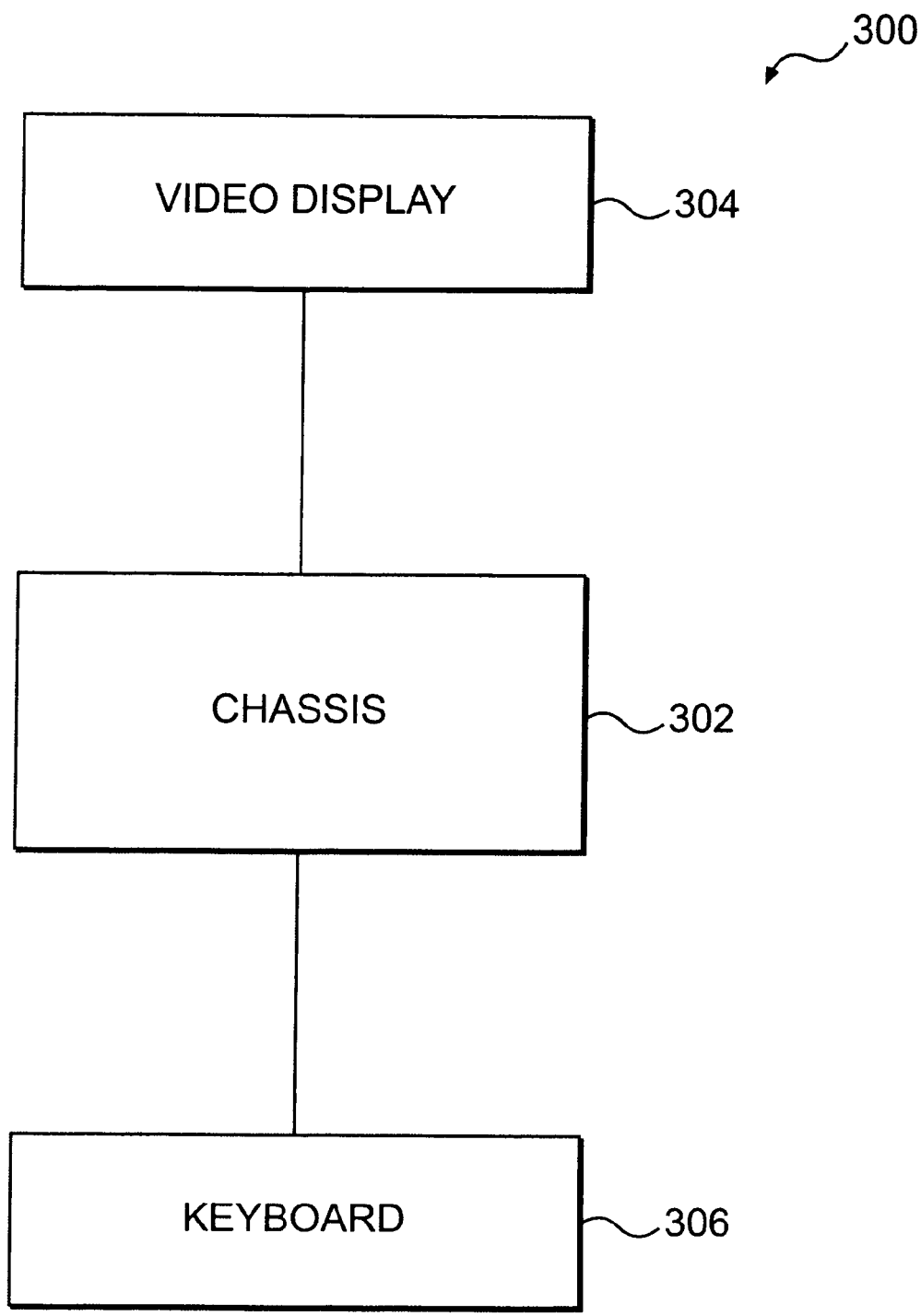
FIG. 3 depicts a data processing system suitable for use in the network of FIG. 2.

FIG. 3 depicts a data processing system 300 suitable for use with methods and systems consistent with the present invention. Data processing system 300 contains a chassis 302 connected to a video display 304 and a keyboard 306. Data processing system 300 is suitable for use as one or more nodes in the network of FIG. 2.

Figure 4:
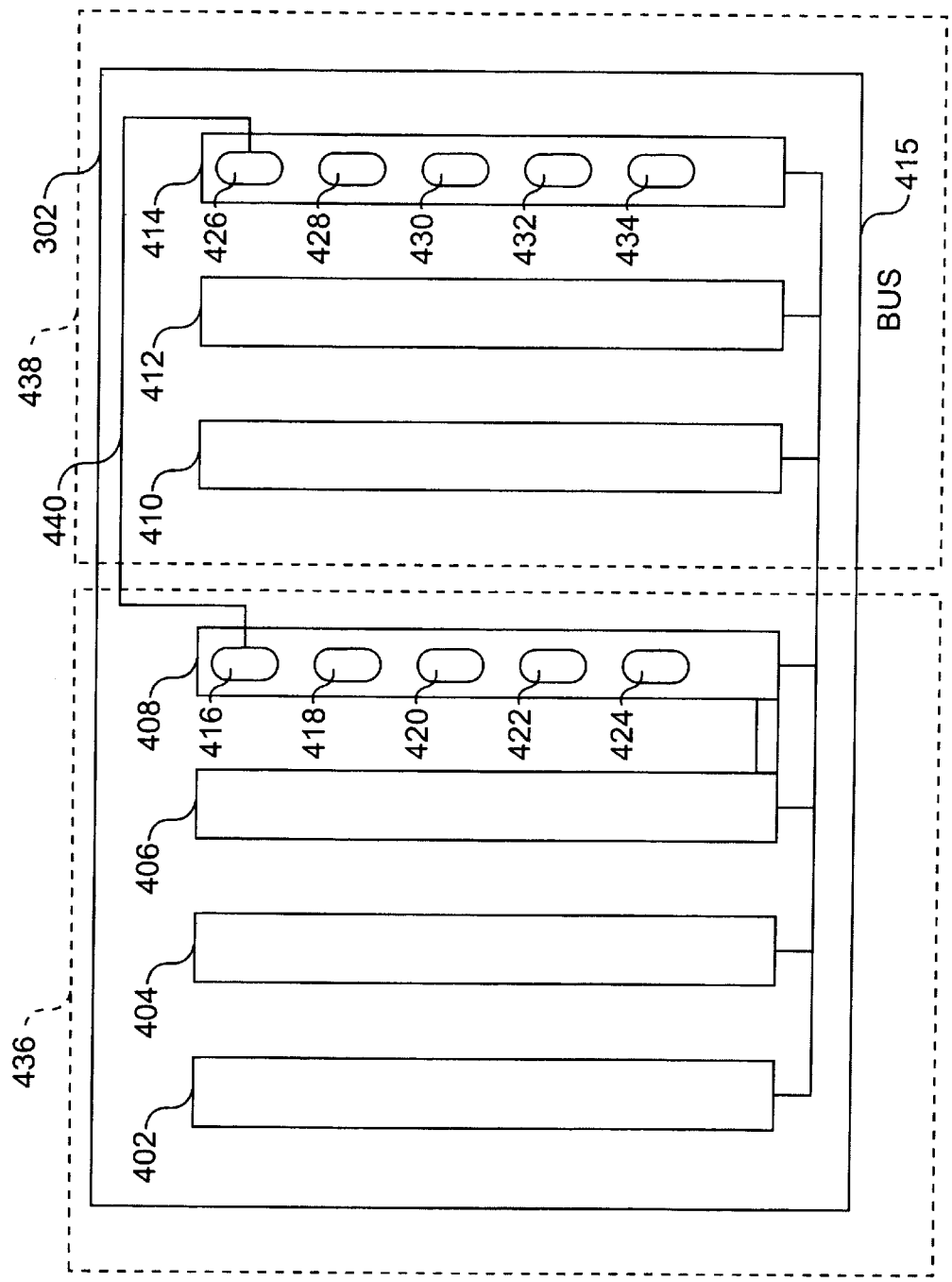
FIG. 4 depicts a more detailed diagram of the chassis of FIG. 3.

As shown in FIG. 4, chassis 302 contains up to seven cards 402–414 interconnected via bus 415. Of these cards, cards 408 and 414, known as routing cards, perform routing functionality with each having five ports 416–424 and 426–434 that connect to a communication link (e.g., a cable). The cards other than the routing cards (i.e., cards 402–406, 410, and 412) typically contain multiple CPUs, memory, and secondary storage. In accordance with methods and systems consistent with the present invention, cards 402–408 form a single node 436. Likewise, cards 410–414 form a single node 438. Nodes 436 and 438 are referred to as partner nodes because they are both located in the same chassis 302. Since node 436 and node 438 are separate communications nodes, they may be interconnected via a communications link 440, known as a partner link. A partner link is used to transfer control information between two partner nodes; the actual data is transferred via the bus 415 for faster communications. One skilled in the art will appreciate that data processing system 300 and chassis 302 may include additional or different components, including additional nodes.

Figure 5:
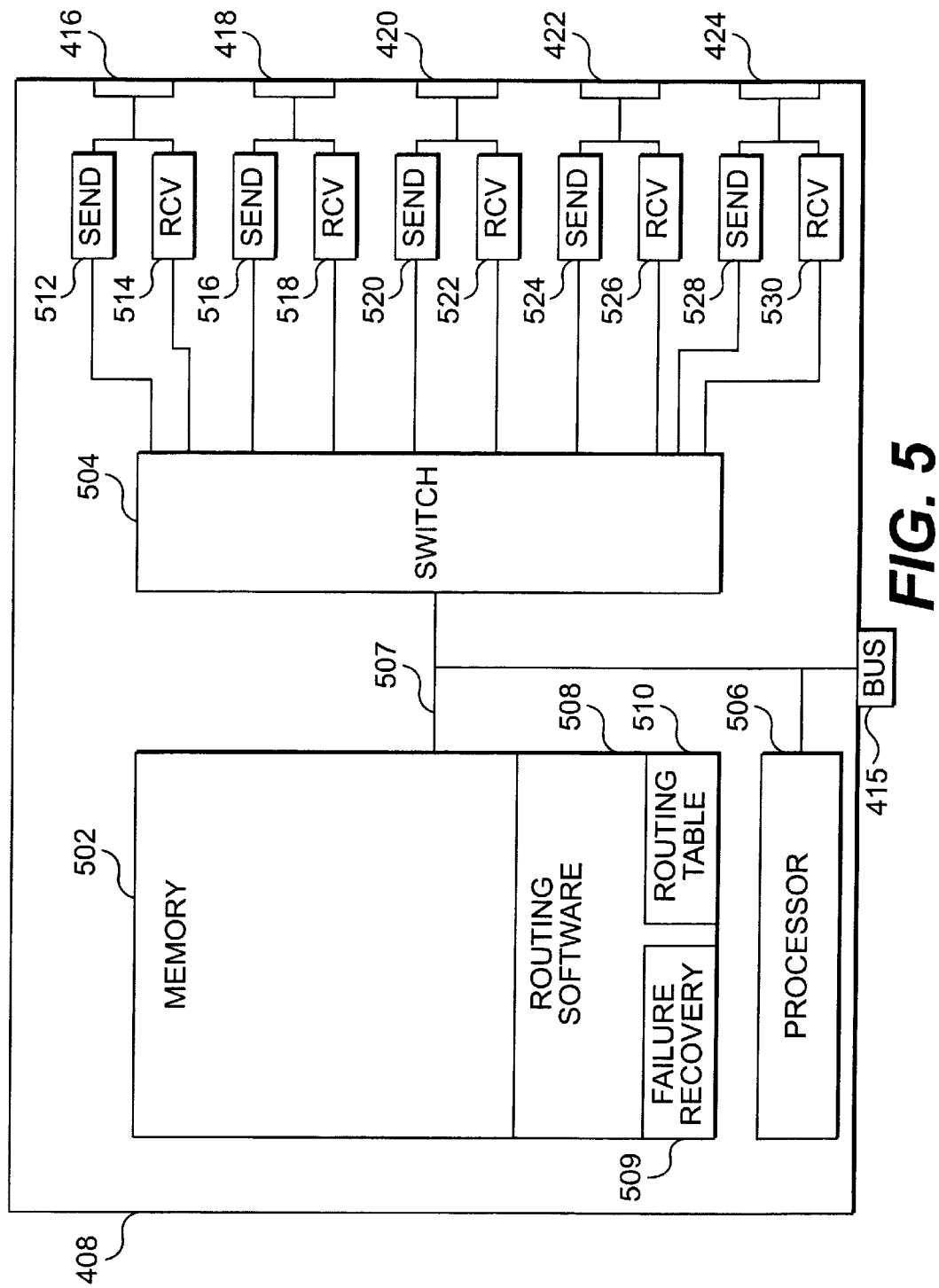
FIG. 5 depicts a more detailed diagram of a routing card depicted in FIG. 4.

FIG. 5 depicts a more detailed diagram of routing card 408, although routing card 414 is similarly configured. Routing card 408 contains a memory 502, a switch 504, and a processor 506 interconnected by an internal bus 507, which also connects to bus 415. Memory 502 contains routing software 508 that routes traffic through the network using routing table 510. Routing table 510 may contain part or all of the information contained in the routing table described above. The routing software 508 also contains the failure recovery system 509. Switch 504 coordinates the sending and receiving of information across the network via ports 416–424 by using a send and receive buffer 512–530 for each port.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Sun, Sun Microsystems, the Sun logo, Java™, and Java™-based trademarks are trademarks or registered trademarks of Sun Microsystems, Inc. in the United States and other countries.

Figure 6:
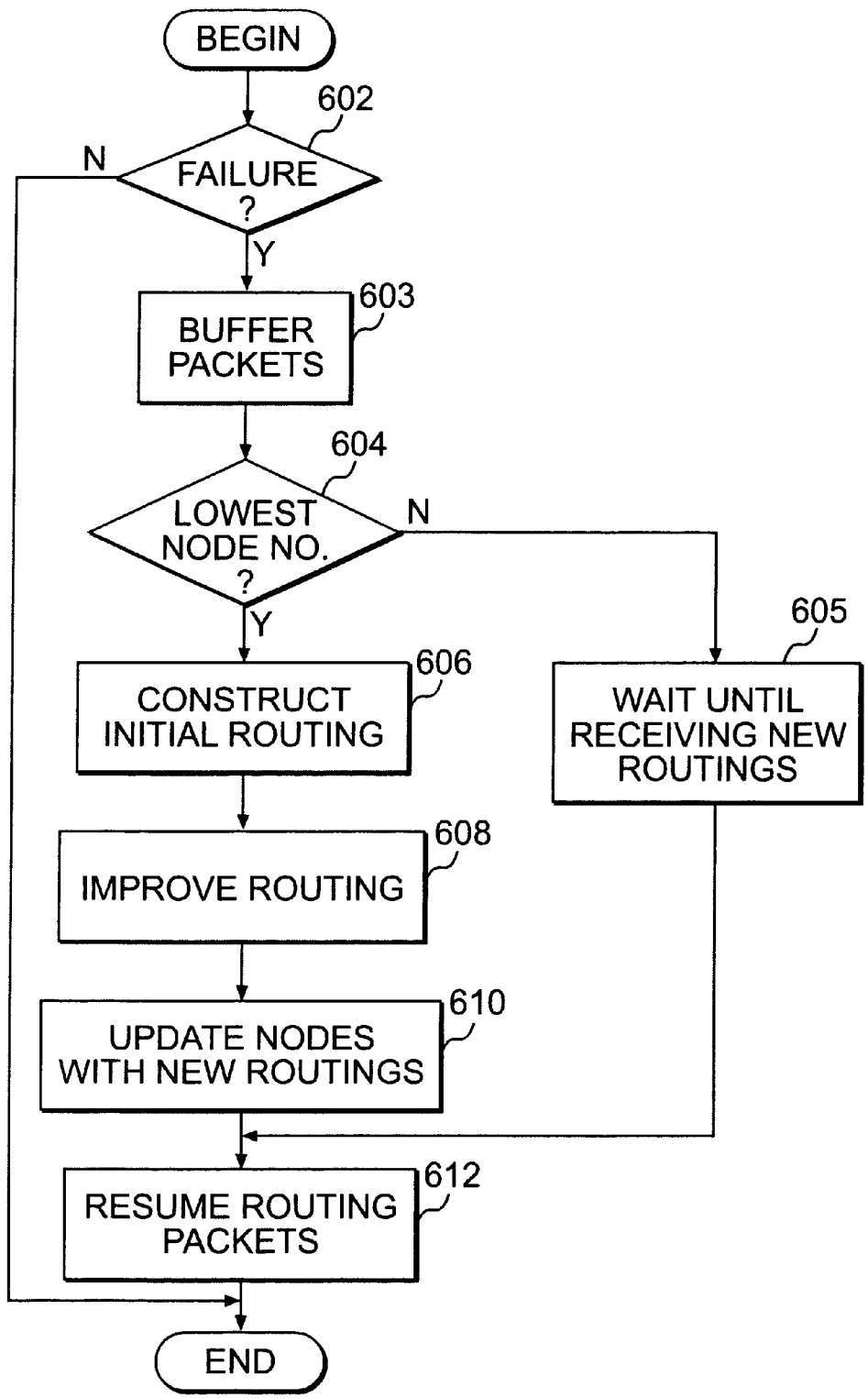
FIG. 6 depicts a flowchart of the steps performed by the failure recovery system in accordance with methods and systems consistent with the present invention.

FIG. 6 depicts a flowchart of the steps performed by the failure recovery system in accordance with methods and systems consistent with the present invention. The first step performed by the system is to detect whether a failure (e.g., node or link failure) has occurred (step 602). In this step, the failure recovery system detects a failure by using a polling mechanism. That is, each node in the network periodically sends test packets to all of its directly connected nodes to determine if each one is alive. Each of these test packets requires a response, and if such a response is not received within a predetermined period time, the node that sent the test packet determines that an error has occurred. In this situation, over all other connections, the node that sent the test packet broadcasts packets ("node-down packets") indicating that that node is unreachable. Upon receiving such a packet, the receiving node propagates the node-down packet to all its directly connected nodes, and in this manner, each node that is currently operating in the network receives notification of the failure.

Additionally, as node-down packets are routed through the network, each node through which the packet is routed stamps the packet with its node number. For example, if a node 8 received a node-down packet originating from node 1 and traveling through nodes 2 and 3, in addition to indicating which node became unreachable, this packet will also indicate that it originated from node 1 and traveled through nodes 2 and 3. After all the node-down packets have been propagated, each node in the network knows which nodes and links have failed and which nodes and links remain operational.

After detecting a failure, the failure recovery system buffers all packets received on the local node other than those that are destined for the local node and also buffers all packets that are being sent by programs on the local node (step 603). This buffering has the effect of stalling the node. It should be noted that such stalling does not lead to loss of data because the routing tables can be regenerated before the buffers fill.

Next, the failure recovery system determines whether the node number of the local node is the lowest node number among all of the nodes remaining operational (step 604). In step 602, each node in the network has been apprised of the failure, and each node has also been apprised of which of the nodes remain operational. Since it is only necessary for one of the failure recovery systems to regenerate the routings, by predetermined convention, the failure recovery system on the node with the lowest node number performs this processing. Therefore, if the local node does not have the lowest node number, it waits until it receives new routings from the node with the lowest number (step 605) and proceeds to step 612. Although it has been described that the node with the lowest node number regenerates the routings, one skilled in the art will appreciate that other selection criteria could be used, like using the fastest node.

However, if the local node has the lowest node number, the system constructs an initial routing for the network (step 606). In the step, the failure recovery system constructs an initial set of routings R, containing a set of paths. For each pair of distinct nodes, a and b, R contains at most one path from a to b. This initial routing is constructed in such a way that it is guaranteed to be deadlock free, but may not be complete. That is, there may be one or more ordered pairs of nodes a and b such that R does not include a path from a and b.

After constructing an initial routing, the failure recovery system improves the routing (step 608). When improving the routing, the failure recovery system considers each ordered pair of distinct nodes a and b, and if there is an existing path between a and b, the failure recovery system attempts to improve it by replacing it with a shorter path. If R does not contain a path from a to b, an attempt is made to identify and add such a path. Sample pseudo code for these two steps is provided below in code table number 1 in the Java™ programming language. The Java programming language is described in greater detail in Gosling, Joy, and Steele, *The Java Language Specification*, Addison-Wesley (1996).

Code Table Number 1

```
// A path is a list of nodes. A routing is a table of paths. Entry [i][j]
// of a routing is a path from node i to node j. A good routing is
   deadlock-free.
public int [ ] [ ] [ ] makeRouting ( ) {
   int [ ] [ ] [ ] result = new int[edges.length] [edges.length] [ ];
   for (int i = 0; i < edges.length; i++) {
      for(int j = 0; j < edges.length; j + +) {
         result[i][j] = bestPath (i, j);
      }
   }
   return improveRouting(result);
}
```

After improving the routings, the failure recovery system updates the nodes with the new routings that were generated in step 608 (step 610) and resumes routing packets using the new routings (step 612).

Figure 7:
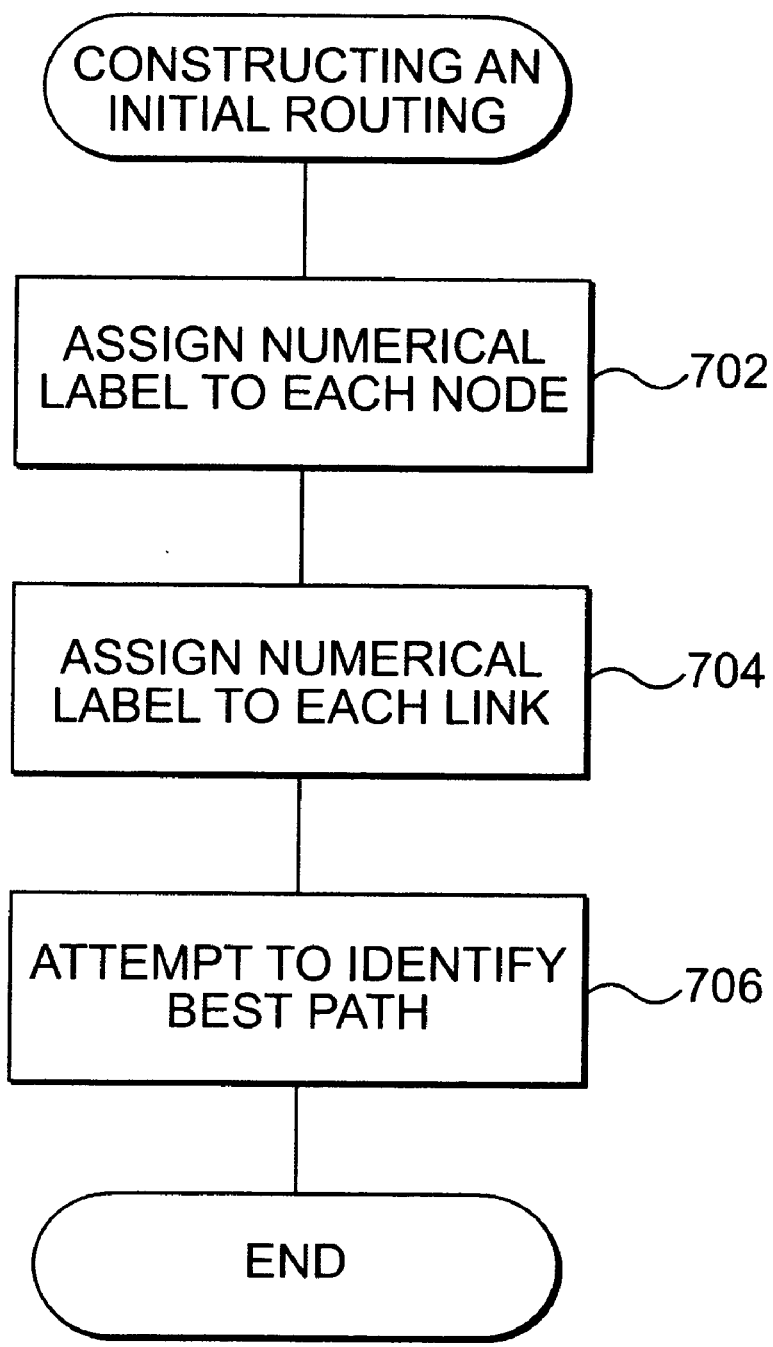
FIG. 7 depicts a flowchart of the steps performed when constructing an initial routing.

FIG. 7 depicts a flowchart of the steps performed when constructing an initial routing. The first step performed by the failure recovery system is to assign a numerical label to each node (step 702). For networks having up to 16 nodes, the following sequence of node labels is used:

int[] nodeLabels=(0, 15, 5, 10, 1, 14, 4, 11, 2, 13, 7, 8, 3, 12, 6, 9);

That is, the failure recovery system assigns node number 0 with label 0, assigns node number 1 with label 15, and assigns node number 2 with label 5. This number assignment continues for as many nodes as the network contains. The node numbers (not the labels) correspond to node numbers as shown in FIG. 2 and the node numbers found in co-pending U.S. patent application Ser. No. 09/323,963, entitled "Improved Network Topologies." Note that node numbers are assigned in such a way that partner nodes have numbers that differ by 1, with the even number being the smaller of the two. Thus, nodes 0 and 1 are partner nodes. Per the node labels shown above, the labels of partner nodes sum to 15. In fact, the labels "xor" to 15, because when represented as 4-bit binary numbers, they have complementary bit patterns.

Each link is then assigned a numerical label based on the labels of the two nodes that the link connects (step 704). The resulting link label is an integer from 16 to 64. If the xor of the two node labels is 15, then the nodes are partner nodes and that link is given the label 64. Because the failure recovery system generates paths with ascending link labels, partner links tend to occur last in a path, and such paths are preferred over other paths of equal length to improve throughput.

If the xor of the two node labels has a single 1-bit, then the link is labeled 32 plus that single bit (i.e., 33, 34, 36, or 40). Otherwise, a more complicated heuristic computation is performed that produces a link label in the range 16 to 31 or 48 to 63. Described below, this complex calculation is designed to break certain symmetries to facilitate the calculation of a deadlock-free routing. In other words, if a simplistic calculation were used instead of the complex one described below, then parts of the network that were structurally similar would route similarly, which may lead to deadlock. For example, if a network comprised a number of nodes in a circular topology and each node routed clockwise based on the simplistic calculation, a cycle would form which may lead to deadlock.

Assuming the number of nodes that remain operational is designated as N and the array nodeLabels is indexed by node numbers as shown in FIG. 2, the following pseudo code written in the Java programming language computes the label for the directed link that connects node number i to node number j:

Code Table Number 2

```
public int heuristicEdgeWeight(int i, int j) {
    int xor = nodeLabels(i) ^ nodeLabels[j];
    if (xor == 15) return 64;
    if((xor & -xor) == xor) return xor + 32;
    int ni = (nodeLabels[i] ^ nodeLabels[N-1]) & xor;
    int nj = (nodeLabels[j] ^ nodeLabels[N-1]) & xor;
    boolean adjacent = ((i & ~1) == ((N-1) & ~1)) |
                        ((j & ~1) == ((N-1) & ~1));
    return (ni < nj) ^ adjacent ? 48 + nj : 16 + nj;
}
```

Figure 8:
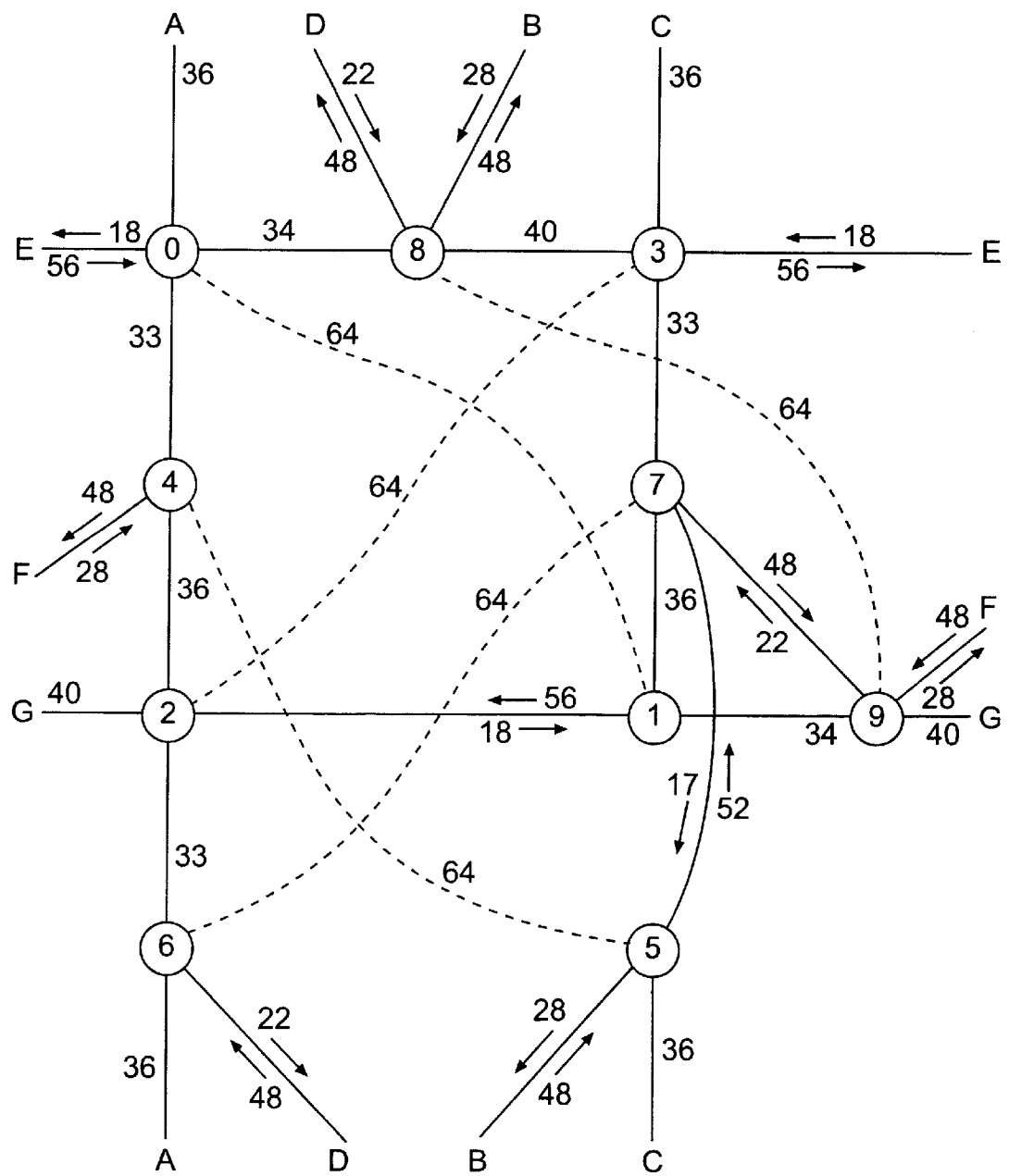
FIG. 8 depicts the network of FIG. 2 labeled in accordance with methods and systems consistent with the present invention.

Assuming a failure of links 4–6 and 1–5, FIG. 8 depicts an example of link labels assigned to the links of the network depicted in FIG. 2 using this algorithm. Note that all partner links are labeled 64.

After assigning a numerical label to each link, the failure recovery system attempts to identify the best path for each pair of nodes a and b (step 706). This processing is performed by considering all paths of length three or less from a to b. The failure recovery system rejects multihop paths unless their links, considered in order from a to b, have labels that form a strictly ascending sequence (e.g., 18, 36, 64). Among paths that are not so rejected, the failure recovery system prefers a shorter path to improve throughput. Among paths of equal length, the failure recovery systems prefers the path with the higher last label to maximize the usage of partner links. If the last links of two paths have the same label, then the failure recovery system selects either one. After identifying the best path, the failure recovery system places the path in R. But if all paths are rejected because their links do not have labels in strictly ascending order, then no path from a to b is placed in R. For example, assuming that links 4–6 and 1–5 fail in the network of FIG. 8, the initial routings for the network using this algorithm are provided below. Note that there is no path from node 1 to node 4 and no path from node 1 to node 5 because no path could be found where the links traversed were in a strictly ascending order.

| FROM \ TO | 0 | 1 | 2 | 3 | 4 | 5 | 6 | 7 | 8 | 9 |
|---|---|---|---|---|---|---|---|---|---|---|
| 0 | X | — | 3 | — | — | 4 | — | 6 | — | 8 |
| 1 | — | X | — | 2 | NONE | NONE | 7 | — | 9 | — |
| 2 | 1 | — | X | — | — | 4 | — | 6 | 9 | — |
| 3 | — | 0 | — | X | 5 | — | 7 | — | — | 8 |
| 4 | — | 0 | — | 2 | X | — | 0 | 0, 6 | 9 | — |
| 5 | 3 | 3, 0 | 3 | — | — | X | 7 | — | — | 8 |
| 6 | — | 0 | — | 2 | 2 | 8 | X | — | — | 8 |
| 7 | 1 | — | 3 | — | 5 | — | — | X | 9 | — |
| 8 | — | 0 | 3 | — | 5 | — | — | 6 | X | — |
| 9 | 1 | — | — | 2 | — | 4 | 7 | — | — | X |

Since every path in R uses links in ascending numerical order, the routings are deadlock-free because a cycle is avoided. Sample pseudo code in the Java programming language is provided below that describes the processing associated with obtaining the best path.

Code Table Number 3

```
//  Return best path from i to j (but not longer than 3)
public int [ ] bestPath (int i, int j) {
    for(int m = 0; m <= 3; m++) {
        int [ ] [ ] choices = paths (i, j, m);
        int [ ] [ ] bestChoice = null;
        for (int k = 0; k < choices.length; k++) {
            int[ ] candidate = choices[k];
            if (acceptable (candidate) && better (candidate, bestChoice))
                bestChoice = candidate;
        }
        if (bestChoice != null)
            return bestChoice;
    }
    return null;           // failure
}
boolean acceptable(int [ ] candidate) {
    if (candidate == null) return false;
    if (candidate.length <= 2) return true;
    if (candidate.length == 3)
        return edgeWeight (candidate[0], candidate [1])
            <edgeWeight(candidate[1, candidate[2]);
    if (candidate.length == 4)
        return (edgeWeight(candidate[0], candidate[1])
            < edgeweight(candidate[1], candidate[2])) &&
            (edgeWeight(candidate[1], candidate[2])
            < edgeweight(candidate[2], candidate[3]));
    for (int k = 2; k < candidate.length; k++)      {
        if (!(edgeWeight(candidate[k-2], candidate [k-1])
            < edgeWeight(candidate[k 1], candidate[k])))
            returnfalse;
    }
    return true;
}
boolean better(int [ ] candidate, int[ ]  bestChoice)  {
    if (acceptable(candidate))
        if (acceptable(bestChoice)) {
            return edgeWeight[candidate[candidate.length-2],
                    candidate[candidate.length-1])
                > edgeWeight (bestChoice [bestChoice.length-2],
                    bestChoice[bestChoice.length-1]);
        }
        else {
            return true;
        }
    }
    else {
        if (acceptable(bestChoice))      {
            returnfalse;
        }
    else {
        return (candidate != null) &&
            ((bestChoice == null)  ||
```

-continued

Code Table Number 3

```
edgeWeight (candidate [candidate.length-2],
            candidate [candidate.length-1])
>edgeWeight(bestChoice[bestChoice.length-2),
            bestChoice[bestChoice.length-1]));
    }
  }
}
```

Figure 9:
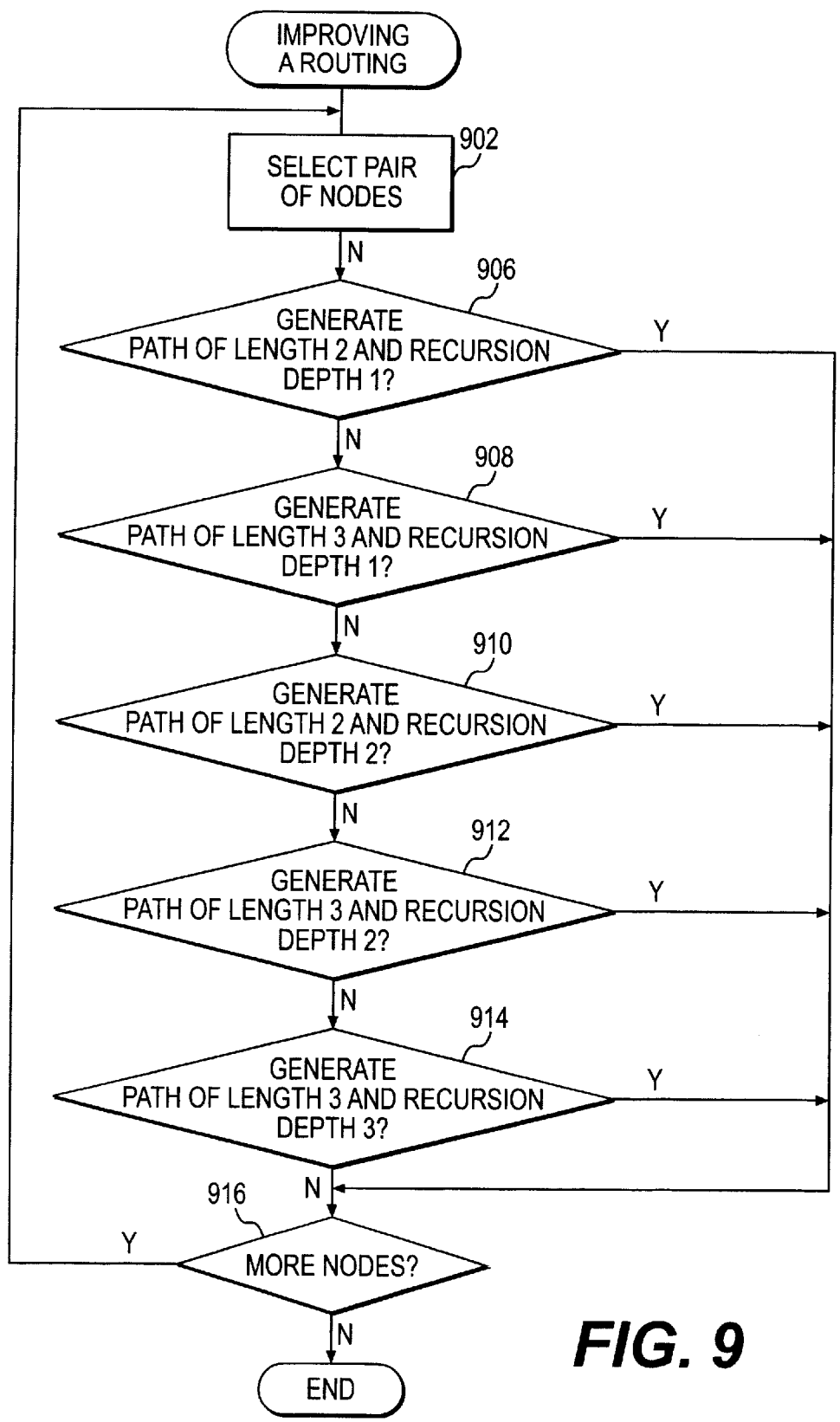
FIG. 9 depicts a flowchart of the steps performed when improving a routing.

FIG. 9 depicts a flowchart of the steps performed when improving a routing. The first step performed by the failure recovery system is to select a pair of nodes, a and b, from the network (step 902). Next, the failure recovery system attempts to generate a path of length two and a recursion depth 1 by invoking the improvePath routine (step 906). The "recursion depth" refers to the levels of recursion that the improvePath routine is allowed to perform. Discussed in further detail below, the improvePath routine attempts to create a path of the desired length between two nodes that are received as parameters. The improvePath routine first attempts to create such a path, and if one is created, it tests to determine if the addition of this path would subject the network to deadlock. If not, the improvePath routine adds the path to the set of routings. However, if the addition of the path will lead to deadlock and the improvePath routine is allowed to operate recursively, the improvePath routine then determines all paths between the nodes, selects one, and tests if this path would subject the network to deadlock by creating a cycle. If it would subject the network to deadlock, the improvePath routine identifies the cycle created and attempts to replace one of the paths in the cycle by invoking itself recursively. In this manner, the improvePath routine is able to create a path between two nodes that do not have one and is able to improve an existing path between two nodes.

If a path was added in step 906, processing continues to step 916. Otherwise, the failure recovery system attempts to add to R a path from a to b using path length 3 and recursion depth 1 by invoking the improvePath routine (step 908). If this step is successful, processing continues to step 916. If unsuccessful, however, the failure recovery system attempts to add to R a path from a to b using path length 2 and recursion depth 2 by invoking the improvePath routine (step 910). If such a path does not exist, the failure recovery system attempts to add to R a path from a to b using path length 3 and recursion depth 2 by invoking the improvePath routine (step 912). If this cannot be done, the failure recovery system, by invoking the improvePath routine, attempts to add to R a path from a to b using path length 3 and recursion depth 3 (step 914). If this path cannot be added, then R will not contain a path from a to b, and thus, the routings will be incomplete. Next, the failure recovery system determines if there are more nodes in the network for processing. If so, processing continues to step 902. Otherwise, processing ends.

When improving the initial routing provided in the example above, the failure recovery system discovers that using paths [1, 0, 4] and [1, 7, 5] will not lead to deadlock, thus they are added to R. Furthermore, the failure recovery system discovers that path [4, 0, 6, 7] can be replaced with [4, 5, 7] without leading to deadlock. Additionally, it determines that the path [5, 3, 0, 1] can be optimized to a length of two by using the path [5, 7, 1], but this path creates a cycle [5, 7, 1, 0, 4] because paths [7, 1, 0], [1, 0, 4], [0, 4, 5], and [4, 5, 7] are already in R. Thus, the failure recovery system recursively considers each path in the cycle for removal.

When it considers removing [7, 1, 0], the alternatives are [7, 3, 0] and [7, 6, 0]. When analyzing [7, 3, 0], the failure recovery system determines that the routings are deadlock-free, so it uses the [5, 7, 1] path and replaces [7, 1, 0] with [7, 3, 0]. The resulting routings are provided below:

| FROM \ TO | 0 | 1 | 2 | 3 | 4 | 5 | 6 | 7 | 8 | 9 |
|---|---|---|---|---|---|---|---|---|---|---|
| 0 | X | — | 3 | — | — | 4 | — | 6 | — | 8 |
| 1 | — | X | — | 2 | 0 | 7 | 7 | — | 9 | — |
| 2 | 1 | — | X | — | — | 4 | — | 6 | 9 | — |
| 3 | — | 0 | — | X | 5 | — | 7 | — | — | 8 |
| 4 | — | 0 | — | 2 | X | — | 0 | 5 | 9 | — |
| 5 | 3 | 7 | 3 | — | — | X | 7 | — | — | 8 |
| 6 | — | 0 | — | 2 | 2 | 8 | X | — | — | 8 |
| 7 | 3 | — | 3 | — | 5 | — | — | X | 9 | — |
| 8 | — | 0 | 3 | — | 5 | — | — | 6 | X | — |
| 9 | 1 | — | — | 2 | — | 4 | 7 | — | — | X |

Following is pseudo code describing the processing of FIG. 9.

Code Table Number 5

```
// Returns a new routing that may have anomalous paths but nevertheless
// is deadlock-free.
int[ ][ ] improveRouting(int[ ][ ] routing) {
  int[ ][ ] result = new int[routing.length][routing[0].length][ ];
  for (int i = 0; i < routing.length; i++)
    for (int j = 0; j < routing[i].length; j++)
       result[i][j] = routing[i][j];
  for (int i = 0; i < routing.length; i++) {
    for (int j = 0; j < routing[i].length; j++) {
      if(!improvePath(result, i, j, 2, 1))
        if (!improvePath(result, i, j, 3, 1))
          if(!improvePath(result, i, j, 2, 2))
            if (!improvePath(result, i, j, 3, 2))
              improvePath(result, i, j, 3, 3);
    }
  }
  return result;
}
```

Figure 10A:
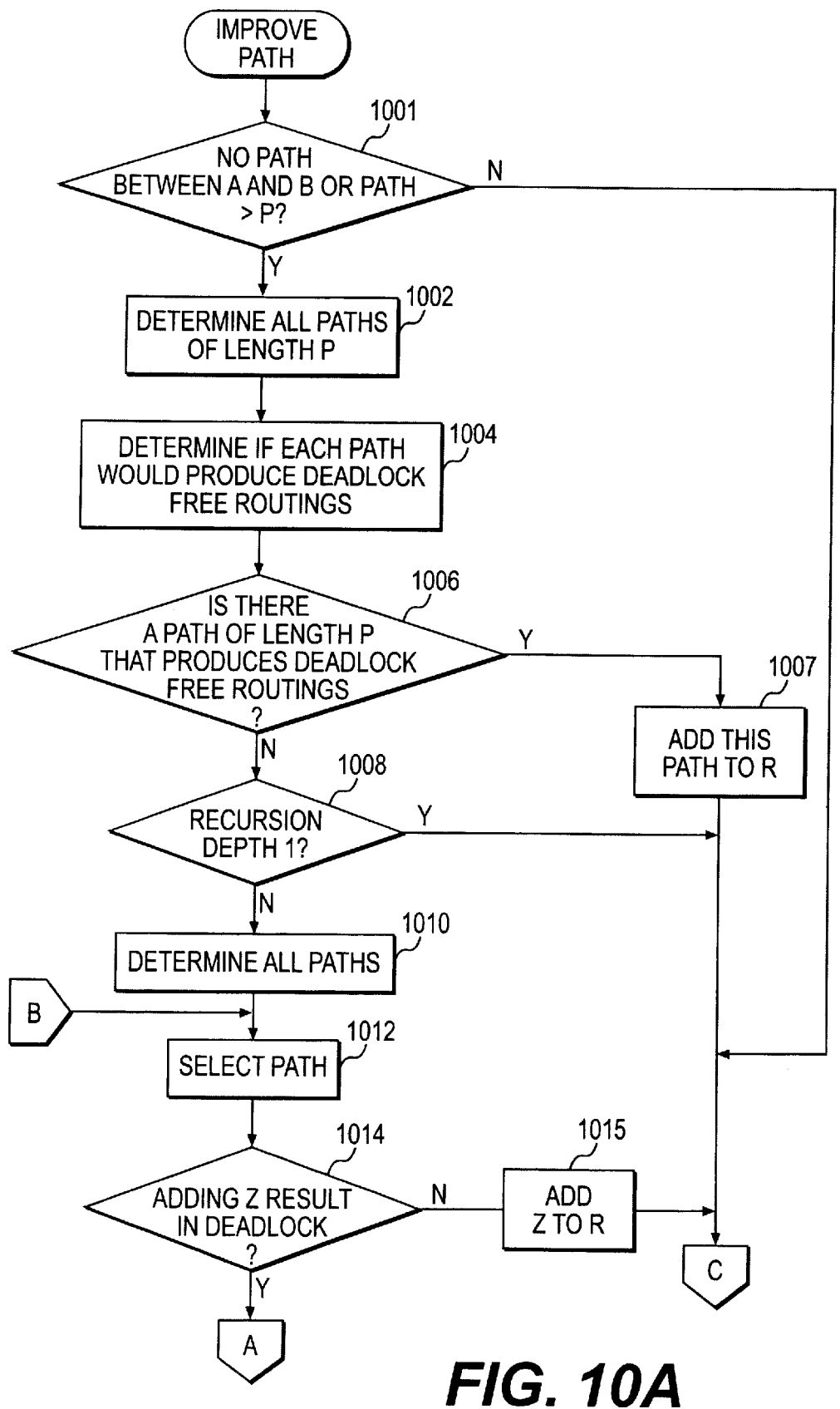
FIGS. 10A and 10B depict a flowchart of the steps performed when improving a path.
Figure 10B:
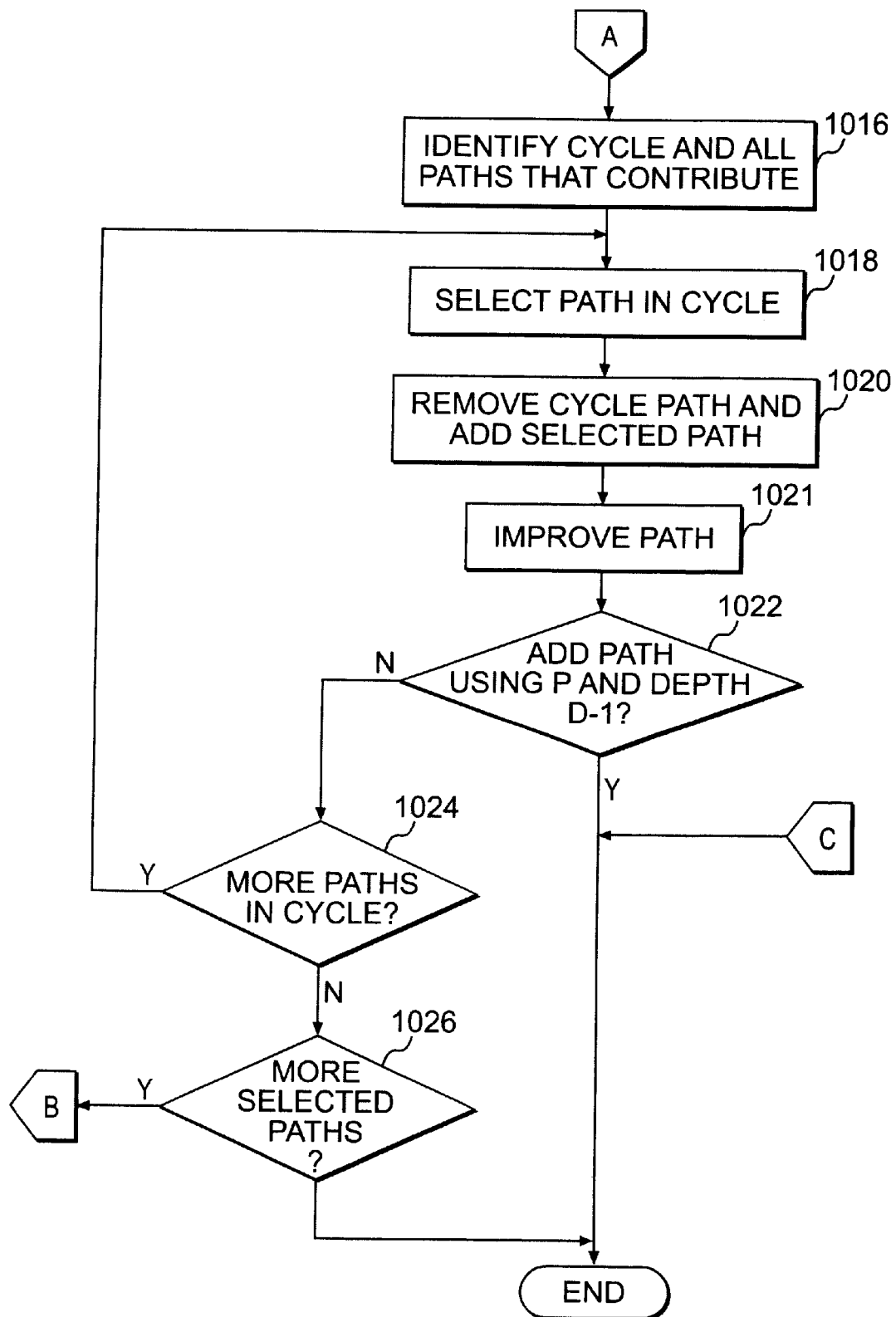

FIGS. 10A and 10B depict a flowchart of the steps performed by the improvePath routine when attempting to generate a path from a to b using path length p and recursion depth d. First, the improvePath routine determines if there is an existing path and, if so, whether it has a length less than p (step 1001). If there is a path having a length less than p, processing ends. Otherwise, the routine attempts to create or improve the path by generating all possible paths ("W") of length p from a to b, even paths that use links in a nonascending order (step 1002). For each such path "w," the improvePath routine tests whether R with that path w added to it would be deadlock-free (step 1004). Determining whether the routings in R would be deadlock-free is discussed in greater detail below. If any such path w is found, the improvePath routine adds w to R (step 1007) and processing ends.

If such a path is not found, the improvePath routine determines if the recursion depth d is 1 (step 1008), and if so, it terminates processing without adding any path to R. In this situation, the recursion depth parameter "d" prevents the routine from continuing and performing recursive processing. If the recursion depth is not 1, the improvePath routine considers all possible paths ("Z") of length p from a to b, even paths that use links in an order such that their labels are not in ascending order (step 1010). Each of these paths "z" will be analyzed below. If after analyzing each path, no path is added to R, then the routine terminates without adding a path between a and b.

Next, the improvePath routine selects one of the paths z (step 1012) and determines if adding the selected path z to R would subject the network to deadlock (step 1014). If adding path z to R would not subject the network to deadlock, then the improvePath routine adds this path to R (step 1015) and processing ends. If, however, adding path z to R would subject the network to deadlock, then the improvePath routine identifies a cycle that would occur if z were added to R and identifies the paths "C" in R that together contribute to the cycle (step 1016 in FIG. 10B). In this step, the routine attempts to utilize the path z by replacing other parts of the cycle, thus breaking it. If the cycle can be broken, then the path may be used and deadlock will be avoided. Below, each path of the cycle is analyzed, and if after the analysis, no path from a to b has been added to R, then the routine terminates without adding any path to R.

In analyzing these paths C, the improvePath routine selects one such path "c" (step 1018). The improvePath routine then removes path c from R and adds path z to R (step 1020). Assuming that pat c extends from node f to node g, the improvePath routine then invokes itself recursively to attempt to add to R a path from f to g, using path length p and recursion depth d−1 (step 1021). If the recursive invocation results in adding a path from f to g (step 1022), then the improvePath routine terminates, because (1) R now has some path (other than c) from f to g, (2) R has a path z from a to b, and (3) R is known to be deadlock-free. Otherwise, the improvePath routine determines if there are more paths in C for consideration (step 1024). If so, processing continues to step 1018. If not, the improvePath routine determines if there are more paths z (step 1026). If there are more paths z, processing continues to step 1012. Otherwise, processing ends. The improvePath routine is described below in pseudo code written in the Java programming language:

Code Table Number 4

```
// Returns true if it improved the path.
boolean improvePath(int[ ][ ][ ] result, int i, int j, int length, int depth) {
   if(result[i][1]== null || result[i](i).length > length+1) {
      int[ ][ ] choices = paths(i, j, length);
      if (choices.length > 0) {
         int[ ] oldPath = result[i][j];
         for (int k = 0; k < choices.length; k++) {
            result[i][j] = choices[k];
            int[ ] dpath = deadlockPath(result);
            if (dpath == null) {
               return true;
            }
         }
      }
      // None of the choices work. Try recursive improvement?
      if(depth > 1) {
         for (int k = 0; k < choices.length; k++) {
            result[i][j] = choices[k];
            int[ ] dpath = deadlockPath(result);
            for (int m = 1; m <= dpath.length; m++) {
```

Code Table Number 4
-continued

```
               // It is intentional that m not start at 0---tends to save time.
               int q = dpath[m % dpath.length];
               int r = dpath[(m + 2) % dpath.length];
               if (result[q][r] != null) {
                  int[ ] oldOtherPath = result[q][r];
                  result[q][r] = null;
                  if (improvePath(result, q, r, 2, depth-1)) {
                     return true;
                  }
                  result[q][r] = oldOtherPath;
               }
            }
         }
      }
      result[i][j] = oldPath;
   }
   return false;
}
```

Figure 11:
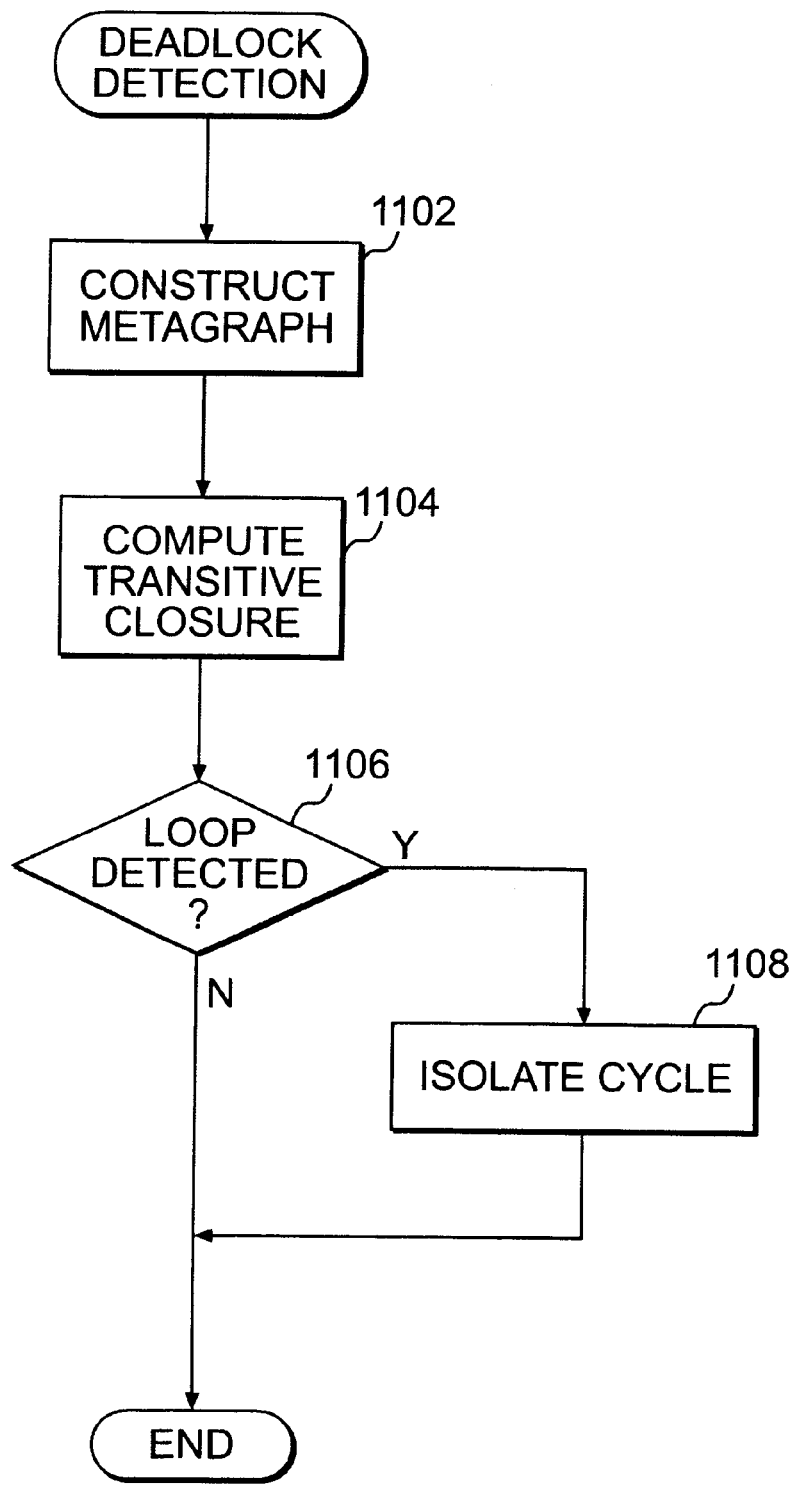
FIG. 11 depicts a flowchart of the steps performed during deadlock detection.

FIG. 11 depicts the steps performed by the failure recovery system to determine whether a set of routings R is deadlock-free by determining whether R contains a cycle. The first step performed by the failure recovery system is to construct a new graph, called a metagraph, from the network topology and the routing R on that topology (step 1102). For every directed link in the network topology, there is a vertex in the metagraph. There is an edge in the metagraph from vertex x to vertex y if and only if there is some path in R such that the links corresponding to vertices x and y appear consecutively within that path. The metagraph is represented as a boolean adjacency matrix in the usual manner familiar to those skilled in the art: entry (i,j) of the matrix is "true" if and only if there is an edge from vertex i to vertex j. An inverted index data structure is also built that can produce, given any edge in the metagraph, some path in R that causes the edge to be in the metagraph. The failure recovery system determines that R is deadlock-free if and only if the metagraph is cycle-free.

For example, assume a network of seven nodes has the following routings:

| FROM \ TO | 0 | 1 | 2 | 3 | 4 | 5 | 6 |
|---|---|---|---|---|---|---|---|
| 0 | X | — | 4 | — | — | — | — |
| 1 | — | X | — | — | — | — | 4 |
| 2 | 1 | — | X | 1 | — | — | — |
| 3 | — | — | 0, 4 | X | 5 | — | — |
| 4 | — | — | — | 0 | X | — | — |
| 5 | — | — | — | — | — | X | 3 |
| 6 | — | 0 | — | — | — | 4 | X |

The metagraph for these routings follows:

| | 0 4 | 4 2 | 1 4 | 4 6 | 2 1 | 1 0 | 1 3 | 3 0 | 3 5 | 5 4 | 4 0 | 5 3 | 3 6 | 6 0 | 0 1 | 6 4 | 4 5 |
|---|---|---|---|---|---|---|---|---|---|---|---|---|---|---|---|---|---|
| 04 | 0 | 1 | 0 | 0 | 0 | 0 | 0 | 0 | 0 | 0 | 0 | 0 | 0 | 0 | 0 | 0 | 0 |
| 42 | 0 | 0 | 0 | 0 | 0 | 0 | 0 | 0 | 0 | 0 | 0 | 0 | 0 | 0 | 0 | 0 | 0 |
| 14 | 0 | 0 | 0 | 1 | 0 | 0 | 0 | 0 | 0 | 0 | 0 | 0 | 0 | 0 | 0 | 0 | 0 |

-continued

|    | 04 | 42 | 14 | 46 | 21 | 10 | 13 | 30 | 35 | 54 | 40 | 03 | 53 | 36 | 60 | 01 | 64 | 45 |
|----|----|----|----|----|----|----|----|----|----|----|----|----|----|----|----|----|----|----|
| 46 | 0  | 0  | 0  | 0  | 0  | 0  | 0  | 0  | 0  | 0  | 0  | 0  | 0  | 0  | 0  | 0  | 0  | 0  |
| 21 | 0  | 0  | 0  | 0  | 0  | 1  | 1  | 0  | 0  | 0  | 0  | 0  | 0  | 0  | 0  | 0  | 0  | 0  |
| 10 | 0  | 0  | 0  | 0  | 0  | 0  | 0  | 0  | 0  | 0  | 0  | 0  | 0  | 0  | 0  | 0  | 0  | 0  |
| 13 | 0  | 0  | 0  | 0  | 0  | 0  | 0  | 0  | 0  | 0  | 0  | 0  | 0  | 0  | 0  | 0  | 0  | 0  |
| 30 | 1  | 0  | 0  | 0  | 0  | 0  | 0  | 0  | 0  | 0  | 0  | 0  | 0  | 0  | 0  | 0  | 0  | 0  |
| 35 | 0  | 0  | 0  | 0  | 0  | 0  | 0  | 0  | 0  | 1  | 0  | 0  | 0  | 0  | 0  | 0  | 0  | 0  |
| 54 | 0  | 0  | 0  | 0  | 0  | 0  | 0  | 0  | 0  | 0  | 0  | 0  | 0  | 0  | 0  | 0  | 0  | 0  |
| 40 | 0  | 0  | 0  | 0  | 0  | 0  | 0  | 0  | 0  | 0  | 1  | 0  | 0  | 0  | 0  | 0  | 0  | 0  |
| 03 | 0  | 0  | 0  | 0  | 0  | 0  | 0  | 0  | 0  | 0  | 0  | 0  | 0  | 0  | 0  | 0  | 0  | 0  |
| 53 | 0  | 0  | 0  | 0  | 0  | 0  | 0  | 0  | 0  | 0  | 0  | 0  | 1  | 0  | 0  | 0  | 0  | 0  |
| 36 | 0  | 0  | 0  | 0  | 0  | 0  | 0  | 0  | 0  | 0  | 0  | 0  | 0  | 0  | 0  | 0  | 0  | 0  |
| 60 | 0  | 0  | 0  | 0  | 0  | 0  | 0  | 0  | 0  | 0  | 0  | 0  | 0  | 0  | 1  | 0  | 0  | 0  |
| 01 | 0  | 0  | 0  | 0  | 0  | 0  | 0  | 0  | 0  | 0  | 0  | 0  | 0  | 0  | 0  | 0  | 0  | 0  |
| 64 | 0  | 0  | 0  | 0  | 0  | 0  | 0  | 0  | 0  | 0  | 0  | 0  | 0  | 0  | 0  | 0  | 0  | 1  |
| 45 | 0  | 0  | 0  | 0  | 0  | 0  | 0  | 0  | 0  | 0  | 0  | 0  | 0  | 0  | 0  | 0  | 0  | 0  |

Next, the failure recovery system computes the transitive closure of the metagraph (step 1104). In accordance with methods and systems consistent with the present invention, the transitive closure is computed using the well-known "Warshall's algorithm," which is described in greater detail in Sedgewick, *Algorithms*, Addison-Wesley 1983, p. 425. The transitive closure of the metagraph will be referred to as "TCM." The metagraph is cycle-free if and only if its transitive closure is loop-free.

If there is no edge in TCM that forms a loop (i.e., an edge going from a vertex to that same vertex) (step 1106), then R is deadlock-free and processing ends. Detecting a loop involves examining the main diagonal of the matrix resulting from Warshall's algorithm in step 1104 to determine whether any element is "true." The TCM for the example metagraph is provided below.

Otherwise, if a loop has been detected, the failure recovery system isolates the cycle (step 1108). This step is performed by starting from any vertex in the metagraph for which TCM has a loop edge, then making E transitions within the metagraph in the following manner, where E is the number of vertices in the metagraph: From the most recently visited vertex in the metagraph, examine all the edges extending out from it, pick the edge that goes to the lowest-numbered vertex for which TCM has a loop edge (there must be at least one), and visit that new vertex. After E transitions, there will have been E+1 visits to vertices of the metagraph, but the metagraph has only E vertices, so at least one vertex must appear at least twice. Moreover, because the lowest-numbered reachable vertex with a loop edge is systematically chosen at each step, the last vertex visited appears at least twice. Therefore, the failure recovery system locates the second-to-last occurrence of that last vertex in the sequence of visits. The sequence of visits from that point on is a simple cycle in the metagraph. For every metagraph edge in the cycle identified in step 1108, use the inverted data structure built in step 1102 to find a path in R responsible for that metagraph edge. The set of paths found in this manner constitute a deadlock cycle for R. Example pseudo code for detecting deadlock is provided below.

|    | 04 | 42 | 14 | 46 | 21 | 10 | 13 | 30 | 35 | 54 | 40 | 03 | 53 | 36 | 60 | 01 | 64 | 45 |
|----|----|----|----|----|----|----|----|----|----|----|----|----|----|----|----|----|----|----|
| 04 | 0  | 1  | 0  | 0  | 0  | 0  | 0  | 0  | 0  | 0  | 0  | 0  | 0  | 0  | 0  | 0  | 0  | 0  |
| 42 | 0  | 0  | 0  | 0  | 0  | 0  | 0  | 0  | 0  | 0  | 0  | 0  | 0  | 0  | 0  | 0  | 0  | 0  |
| 14 | 0  | 0  | 0  | 1  | 0  | 0  | 0  | 0  | 0  | 0  | 0  | 0  | 0  | 0  | 0  | 0  | 0  | 0  |
| 46 | 0  | 0  | 0  | 0  | 0  | 0  | 0  | 0  | 0  | 0  | 0  | 0  | 0  | 0  | 0  | 0  | 0  | 0  |
| 21 | 0  | 0  | 0  | 0  | 0  | 1  | 1  | 0  | 0  | 0  | 0  | 0  | 0  | 0  | 0  | 0  | 0  | 0  |
| 10 | 0  | 0  | 0  | 0  | 0  | 0  | 0  | 0  | 0  | 0  | 0  | 0  | 0  | 0  | 0  | 0  | 0  | 0  |
| 13 | 0  | 0  | 0  | 0  | 0  | 0  | 0  | 0  | 0  | 0  | 0  | 0  | 0  | 0  | 0  | 0  | 0  | 0  |
| 30 | 1  | 1  | 0  | 0  | 0  | 0  | 0  | 0  | 0  | 0  | 0  | 0  | 0  | 0  | 0  | 0  | 0  | 0  |
| 35 | 0  | 0  | 0  | 0  | 0  | 0  | 0  | 0  | 1  | 0  | 0  | 0  | 0  | 0  | 0  | 0  | 0  | 0  |
| 54 | 0  | 0  | 0  | 0  | 0  | 0  | 0  | 0  | 0  | 0  | 0  | 0  | 0  | 0  | 0  | 0  | 0  | 0  |
| 40 | 0  | 0  | 0  | 0  | 0  | 0  | 0  | 0  | 0  | 0  | 1  | 0  | 0  | 0  | 0  | 0  | 0  | 0  |
| 03 | 0  | 0  | 0  | 0  | 0  | 0  | 0  | 0  | 0  | 0  | 0  | 0  | 0  | 0  | 0  | 0  | 0  | 0  |
| 53 | 0  | 0  | 0  | 0  | 0  | 0  | 0  | 0  | 0  | 0  | 0  | 1  | 0  | 0  | 0  | 0  | 0  | 0  |
| 36 | 0  | 0  | 0  | 0  | 0  | 0  | 0  | 0  | 0  | 0  | 0  | 0  | 0  | 0  | 0  | 0  | 0  | 0  |
| 60 | 0  | 0  | 0  | 0  | 0  | 0  | 0  | 0  | 0  | 0  | 0  | 0  | 0  | 0  | 1  | 0  | 0  | 0  |
| 01 | 0  | 0  | 0  | 0  | 0  | 0  | 0  | 0  | 0  | 0  | 0  | 0  | 0  | 0  | 0  | 0  | 0  | 0  |
| 64 | 0  | 0  | 0  | 0  | 0  | 0  | 0  | 0  | 0  | 0  | 0  | 0  | 0  | 0  | 0  | 0  | 0  | 1  |
| 45 | 0  | 0  | 0  | 0  | 0  | 0  | 0  | 0  | 0  | 0  | 0  | 0  | 0  | 0  | 0  | 0  | 0  | 0  |

Code Table Number 6

```
// Returns null if deadlock-free, else a deadlock path.
public int[ ] deadlockPath(int[ ][ ] routing) {
  int n = edges.length;
  int edgeCount = 0;
```

Code Table Number 6

```
// Entry [i][j], if nonnegative, is a unique integer for the
// directed edge from node i to node j.
int[ ][ ] edgeMap = new int[n][n];
// This is indexed by edge integers, and gives back the pair (i, j).
int[ ][ ] inverseMap = new int[n*n][2];
for(int i = 0; i < n; i++) {
   for (int j = 0; j < n; j++) {
      edgeMap[i][j] = -1;
   }
}
// Assign a number to each edge that appears in the routing in a path
// of two or more edges (paths with one edge do not contribute to
deadlock).
for (int i = 0; i < n; i++) {
   for (int j = 0; j < n; j++) {
      if(routing[i][j] != null) {
         int m = routing[i][j].length;
         if (m > 2) {
            for (int k = 1; k < m; k++) {
               int p = routing[i][j][k-1];
               int q = routing[i][j][k];
               if (edgeMap [p][q] <0) {
                  edgeMap[p][q] = edgeCount++;
                  inverseMap[edgeMap[p][q]][0] = p;
                  inverseMap[edgeMap [p][q]][1] = q;
               }
            }
         }
      }
   }
}
// Create an adjacency matrix for a new graph whose nodes are the edges that
// were assigned unique integers. There is a meta-edge from edge a to edge b
// iff there is some path in the routing in which edge a precedes edge b.
boolean[ ][ ] edgeMatrix = new boolean[edgeCount][edgeCount];
for (int i = 0; i < n; i++) {
   for (int j = 0; j < n; j++) {
      if (routing[i][j] != null) {
         int m = routing[i][j].length;
         if(m > 2) {
            for (int k = 2; k < m; k++) {
               int p = routing[i][j][k-2];
               int q = routing[i][j][k-1];
               int r = routing[i][j][k];
               edgeMatrix[edgeMap[p][q]][edgeMap[q][r]] = true;
            }
         }
      }
   }
}
//Take the transitive closure.
boolean[ ][ ] closure = warshall(edgeMatrix);
// An edge (meta-node) is reachable from itself iff there is a deadlock
loop.
for (int i = 0; i < edgeCount; i++) {
   if (closure[i][i]) {
      // There is at least one cycle; let's isolate one.
      int[ ] buffer = new int[edgeCount+1];
      int ptr = 0;
      buffer[ptr++] = i;
      foo: while (ptr <= edgeCount) {
         for (int k = 0; k < edgeCount; k++) {
            if (k != buffer [ptr-1]
                && edgematrix[buffer[ptr-1]][k]
                && closure[k][k]) {
               buffer[ptr++] = k;
               continue foo;
            }
         }
         throw new RuntimeException("Cycle algorithm failure");
      }
      ptr = edgeCount-1;
      while (buffer[ptr]!= buffer[edgeCount]) ptr--;
      int[ ] result = new int[edgeCount-ptr];
      for (int q = 0; q < result.length; q++) {
         result[q] = inverseMap[buffer[ptr+1+q]][0];
         if (inverseMap[buffer[ptr+1+q]][1] !=
             inverseMap[buffer[ptr+((q+2) % result.length)]][0])
            System.out.println("Error: edge strangeness");
      }
      return result;
   }
}
return null;
}
boolean[ ][ ] warshall(boolean[ ][ ] matrix) {
   int n = matrix.length;
   boolean[ ][ ] result = new boolean[n][n];
   for (int i = 0; i < n; i++)
      for (int j = 0; j < n; j++)
         result[i][j] = matrix[i][j];
   for (boolean update = true; update; ) {
      update = false;
      for (int i = 0; i < n; i++) {
         for (int j = 0; j < n; j++) {
            if (result[i][j]) {
               for (int k = 0; k < n; k++) {
                  if (result[j][k] && !result[i][k]) {
                     result[i][k] = true;
                     update = true;
                  }
               }
            }
         }
      }
   }
   return result;
}
```

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method in a network with network components including a plurality of nodes that send packets using predefined routings, the method performed by a local one of the plurality of nodes comprising:

detecting when a failure of one of the network components occurs;

buffering packets that originate from the local node and that travel through the local node responsive to detecting the failure;

while the packets are being buffered, constructing initial routings for the plurality of nodes that avoid the failed network component and that avoid deadlock;

attempting to improve the initial routings such that improved initial routings are generated by performing the following steps for at least one pair of the plurality of nodes:

identifying an additional path between the pair of nodes with a shorter length than the routing for the pair of nodes in the initial routings, determining whether the additional path subjects the network to deadlock, and adding the additional path as a routing between the pair of nodes in the improved initial routings when it is determined that the additional path does not subject the network to deadlock, updating the plurality of the nodes with the improved initial routings; and routing the buffered packets using the improved initial routings.

2. The method of claim 1, wherein the attempting step includes the steps of:
   determining whether the initial routings contain a routing for the pair of nodes; and
   identifying a path between the pair of nodes,
   determining whether the identified path subjects the network to deadlock, and
   adding the identified path as a routing between the pair of nodes in the improved initial routings when it is determined that the identified path does not subject the network to deadlock and when it is determined that the initial routings do not contain the routing for the pair of nodes.

3. The method of claim 1, wherein the network components include a plurality of links, and wherein the constructing step includes:
   labeling the links with a numerical value; and
   determining an initial routing for each pair of nodes such that when the initial routing traverses more than one link, the labels in the traversed link follow a predefined sequence.

4. A method in a network with network components including a plurality of nodes that send packets using predefined routings, the method performed by a local one of the plurality of nodes comprising:
   detecting when a failure of one of the network components occurs;
   buffering packets that originate from the local node and that travel through the local node responsive to detecting the failure;
   while the packets are being buffered,
   constructing initial routings for the plurality of nodes that avoid the failed network component and that avoid deadlock;
   attempting to improve the initial routings such that improved initial routings are generated by performing the following steps for at least one pair of the plurality of nodes:
      identifying an additional path between the pair of nodes with a shorter length than the routing for the pair of nodes in the initial routings,
      determining whether the additional path subjects the network to deadlock by:
         determining a cycle produced by the additional path when it is determined that the additional path subjects the network to deadlock, the cycle comprising paths that form the cycle;
         replacing in the improved initial routings one of the paths that form the cycle other than the additional path with a new path; and
         determining whether the improved initial routings with the new path subjects the network to deadlock;
      adding the additional path as a routing between the pair of nodes in the improved initial routings when it is determined that the additional path does not subject the network to deadlock,
   updating the plurality of nodes with the improved initial routings; and
   routing the buffered packets using the improved initial routings.

5. A method in a distributed system containing nodes interconnected via links, each node containing a routing table with routings for routing traffic, the method comprising:
   initiating operation of the distributed system such that the traffic is routed through the nodes using the routings contained in the routing tables; and
   while the distributed system remains operational,
      generating, by one of the nodes, new routings for the routing tables that avoid deadlock; and
      updating, by the one node, the routing tables to utilize the new routings.

6. The method of claim 5, wherein the generating step includes:
   generating the new routings responsive to detection of a network failure.

7. A method in a data processing system having a network with nodes and links interconnecting the nodes, comprising the steps of:
   assigning numerical values to each of the links;
   identifying, for each pair of the nodes, a path through the network that traverses at least one of the links;
   determining whether the numerical values for each link of each path that traverses more than one link follows a predefined sequence; and
   determining that routing traffic through the network using the paths avoids deadlock when it is determined that the numerical values for each link of each path that traverses more than one link follows the predefined sequence.

8. The method of claim 7, wherein the predefined sequence is an increasing numerical order, and wherein the step of determining whether the numerical values includes:
   determining whether the numerical values for each link of each path that traverses more than one link form the increasing numerical order.

9. The method of claim 8, wherein at least two of the nodes are partner nodes connected by a partner link, wherein the numerical values range up to a highest numerical value, and wherein the step of assigning a numerical value includes:
   assigning the highest numerical value to the partner link.

10. A method in a data processing system with a network having nodes and routings for routing traffic between a plurality of the nodes, wherein the routings do not include a routing for traffic between a first of the nodes and a second of the nodes, comprising the steps of:
    identifying a proposed route for routing traffic between the first node and the second node;
    determining whether adding the proposed route to the routings subjects the network to deadlock;
    adding the proposed route to the routings when it is determined that the addition of the proposed route to the routings does not subject the network to deadlock;
    identifying a cycle created by the proposed route when it is determined that the addition of the proposed route to the routings subjects the network to deadlock, wherein the cycle comprises the proposed route and other routes that form the cycle; and
    replacing one of the other routes with a new route to avoid deadlock.

11. The method of claim 10, wherein the replacing step includes:
    determining whether replacing the one of the other routes with the new route subjects the network to deadlock; and
    replacing the one other route with the new route when it is determined that the replacing of the one other route with the new route does not subject the network to deadlock.

12. A method in a data processing system with a network having nodes and links interconnecting the nodes, the data processing system having routings for routing traffic between a plurality of the nodes, wherein the routings do not include a routing for traffic between a first of the nodes and a second of the nodes, comprising the steps of:
   adding a new routing to the routings for transferring traffic between the first node and the second node;
   determining that the routings subject the network to deadlock; and
   replacing the new routing with a second new routing to render the network deadlock free;
   identifying a cycle created by the second new routing when it is determined that replacing the new routing with the second new routing subjects the network to deadlock, wherein the cycle comprises the second new routing and other routings that form the cycle; and
   replacing one of the other routings with a third new routing to avoid deadlock.

13. The method of claim 12, wherein the cycle is formed from cycle-forming ones of the routings and wherein the step of replacing one of the other routings includes:
   replacing one of the cycle-forming routings to destroy the cycle.

14. A distributed system with a plurality of nodes that route traffic using routings in routing tables stored in each of the nodes, comprising:
   a failure recovery system included in one of the plurality of nodes, comprising:
      a memory containing a failure recovery program having code that detects when a network failure occurs, having code that generates new routings for the routing tables that avoid the network failure and that avoid deadlock when the network failure occurs, and having code that updates the routings in the routing tables with the new routings so that the network failure is avoided and deadlock is avoided; and
      a processor for running the failure recovery program.

15. A computer-readable medium containing instructions for controlling a distributed system to perform a method, the distributed system containing nodes interconnected via links, each node containing a routing table with routings for routing traffic, the method comprising:
   initiating operation of the distributed system such that the traffic is routed through the nodes using the routings contained in the routing tables; and
   while the distributed system remains operational,
      generating, by one of the nodes, new routings for the routing tables that avoid deadlock; and
      updating, by one of the nodes, the routing tables to utilize the new routings.

16. The computer-readable medium of claim 15, wherein the generating step includes:
   generating the new routings responsive to detection of a network failure.

17. A computer-readable medium containing instructions for controlling a data processing system to perform a method, the data processing system having a network with nodes and links interconnecting the nodes, the method comprising the steps of:
   assigning numerical values to each of the links;
   identifying, for each pair of the nodes, a path through the network that traverses at least one of the links;
   determining whether the numerical values for each link of each path that traverses more than one link follows a predefined sequence; and
   determining that routing traffic through the network using the paths avoids deadlock when it is determined that the numerical values for each link of each path that traverses more than one link follows the predefined sequence.

18. The computer-readable medium of claim 17, wherein the predefined sequence is an increasing numerical order, and wherein the step of determining whether the numerical values includes:
   determining whether the numerical values for each link of each path that traverses more than one link form the increasing numerical order.

19. The computer-readable medium of claim 18, wherein at least two of the nodes are partner nodes connected by a partner link, wherein the numerical values range up to a highest numerical value and wherein the step of assigning a numerical value includes:
   assigning the highest numerical value to the partner link.

20. A computer-readable medium containing instructions for controlling a data processing system to perform a method, the data processing system having a network with nodes and routings for routing traffic between a plurality of the nodes, wherein the routings do not include a routing for traffic between a first of the nodes and a second of the nodes, the method comprising the steps of:
   identifying a proposed route for routing traffic between the first node and the second node;
   determining whether adding the proposed route to the routings subjects the network to deadlock;
   adding the proposed route to the routings when it is determined that the addition of the proposed route to the routings does not subject the network to deadlock;
   identifying a cycle created by the proposed route when it is determined that the addition of the proposed route to the routings subjects the network to deadlock, wherein the cycle comprises the proposed route and other routes that form the cycle; and
   replacing one of the other routes with a new route to avoid deadlock.

21. The computer-readable medium of claim 20, wherein the replacing step includes:
   determining whether replacing the one of the other routes with the new route subjects the network to deadlock; and
   replacing the one other route with the new route when it is determined that the replacing of the one other route with the new route does not subject the network to deadlock.

22. A computer-readable medium containing instructions for controlling a data processing system to perform a method, the data processing system having a network with nodes and links interconnecting the nodes, the data processing system having routings for routing traffic between a plurality of the nodes, wherein the routings do not include a routing for traffic between a first of the nodes and a second of the nodes, the method comprising the steps of:
   adding a new routing to the routings for transferring traffic between the first node and the second node;
   determining that the routings subject the network to deadlock;
   replacing the new routing with a second new routing to render the network deadlock free;
   identifying a cycle created by the second new routing when it is determined that replacing the new routing with the second new routing subjects the network to deadlock, wherein the cycle comprises the second new routing and other routings that form the cycle; and replacing one of the other routings with a third new routing to avoid deadlock.

23. The computer-readable medium of claim 22, wherein the cycle is formed from cycle-forming ones of the routings and wherein the step of replacing one of the other routings includes:

replacing one of the cycle-forming routings to destroy the cycle.

24. A method in a network with network components including a plurality of nodes that send packets using predefined routings, the method performed by a local one of the plurality of nodes comprising:

detecting when a failure of one of the network components occurs;

buffering packets that originate from the local node and that travel through the local node responsive to detecting the failure;

while the packets are being buffered, constructing initial routings for the plurality of nodes that avoid the failed network component and that avoid deadlock;

attempting to improve the initial routings such that improved initial routings are generated by performing the following steps for at least one pair of the plurality of nodes:

identifying an additional path between the pair of nodes with a shorter length than the routing for the pair of nodes in the initial routings, determining whether the additional path subjects the network to deadlock including the steps of:

determining a cycle produced by the additional path when it is determined that the additional path subjects the network to deadlock, the cycle comprising paths that form the cycle, replacing in the improved initial routings one of the paths that form the cycle other than the additional path with a new path, and determining, following the replacing step, whether the improved initial routings subjects the network to deadlock;

adding the additional path as a routing between the pair of nodes in the improved initial routings when it is determined that the additional path does not subject the network to deadlock;

updating the plurality of the nodes with the improved initial routings; and routings the buffered packets using the improved initial routings.

25. A method in a data processing system with a network having nodes and routings for routing traffic between a plurality of the nodes, wherein the routings do not include a routing for traffic between a first of the nodes and a second of the nodes, comprising the steps of:

identifying a proposed route for routing traffic between the first node and the second node;

determining whether adding the proposed route to the routings subjects the network to deadlock;

adding the proposed route to the routings when it is determined that the addition of the proposed route to the routings does not subject the network to deadlock;

identifying a cycle created by the proposed route when it is determined that the addition of the proposed route to the routings subjects the network to deadlock, wherein the cycle comprises the proposed route and other routes that form the cycle; and replacing one of the other routes with a new route to avoid deadlock.

26. A computer-readable medium containing instructions for controlling a data processing system to perform a method, the data processing system having a network with nodes and routings for routing traffic between a plurality of the nodes, wherein the routings do not include a routing for traffic between a first of the nodes and a second of the nodes, the method comprising the steps of:

identifying a proposed route for routing traffic between the first node and the second node;

determining whether adding the proposed route to the routings subjects the network to deadlock;

adding the proposed route to the routings when it is determined that the addition of the proposed route to the routings does not subject the network to deadlock;

identifying a cycle created by the proposed route when it is determined that the addition of the proposed route to the routings subjects the network to deadlock, wherein the cycle comprises the proposed route and other routes that form the cycle; and replacing one of the other routes with a new route to avoid deadlock.

* * * * *

UNITED STATES PATENT AND TRADEMARK OFFICE
CERTIFICATE OF CORRECTION

PATENT NO. : 6,791,939 B1 Page 1 of 1
DATED : September 14, 2004
INVENTOR(S) : Guy L. Steele, Jr. et al.

It is certified that error appears in the above-identified patent and that said Letters Patent is hereby corrected as shown below:

Title page,
Item [75], Inventors, "Chelmsford," should read -- Acton --.

Column 24,
Line 3, "routings the" should read -- routing the --.

Signed and Sealed this

Twenty-third Day of November, 2004

JON W. DUDAS
*Director of the United States Patent and Trademark Office*